United States Patent
Foster et al.

(10) Patent No.: US 6,634,289 B2
(45) Date of Patent: Oct. 21, 2003

(54) SCREEN PRINTING STENCIL PRODUCTION

(75) Inventors: David Joseph Foster, Swindon (GB); John William Jones, Wantage (GB)

(73) Assignee: Autotype International Limited (GB)

( * ) Notice: Subject to any disclaimer, the term of this patent is extended or adjusted under 35 U.S.C. 154(b) by 172 days.

(21) Appl. No.: 09/898,664

(22) Filed: Jul. 3, 2001

(65) Prior Publication Data

US 2002/0007742 A1 Jan. 24, 2002

Related U.S. Application Data

(63) Continuation of application No. 09/245,190, filed on Feb. 5, 1999, now abandoned.

(30) Foreign Application Priority Data

Feb. 6, 1998 (GB) .............................................. 9802630

(51) Int. Cl.⁷ ................................................. B41C 1/14
(52) U.S. Cl. ..................... 101/128.4; 101/129; 430/308
(58) Field of Search ........................ 101/128.21, 128.4, 101/129; 347/96, 102, 103; 430/308

(56) References Cited

U.S. PATENT DOCUMENTS

| | | | |
|---|---|---|---|
| 1,606,217 A | 11/1926 | Gestetner | |
| 3,922,445 A | 11/1975 | Mizuno et al. | |
| 4,014,289 A | 3/1977 | Zimmer | |
| 4,254,194 A | 3/1981 | Merrill et al. | |

(List continued on next page.)

FOREIGN PATENT DOCUMENTS

| | | |
|---|---|---|
| CA | 2088400 | 1/1994 |
| EP | 0 108 509 | 5/1984 |
| EP | 0 492 351 A1 | 7/1992 |
| EP | 0 588 399 A1 | 3/1994 |
| EP | 0 635 362 A1 | 1/1995 |
| EP | 0 672 268 A1 | 9/1995 |
| EP | 0 710 552 A2 | 5/1996 |
| EP | 0 883 026 A1 | 12/1998 |
| GB | 180778 | 6/1922 |
| GB | 1431462 | 4/1976 |
| GB | 2 329 611 A | 3/1999 |
| WO | 97/43122 | 11/1997 |
| WO | 99/02344 | 1/1999 |

OTHER PUBLICATIONS

The Theory of the Photographic Process, 4th edition, T.H. James, 1977, pp. 77–87.

Advertisement from Gerber Scientific Products for "Screen-Jet"—Screen Imaging System for Textile Screenprinting ©1992 Gerber Scientific Products, Inc.

Publication from Screen Process dated Aug. 1997 entitled Latest Situation and Current Facts on Electronic Stencil Making by Thomas Schweizer et al.

Publication from Lüscher by Thomas Schweizer, et al dated Jan. 1996.

Publication from Lüscher by Thomas Schweizer dated Aug. 1996.

*Primary Examiner*—Ren Yan
(74) *Attorney, Agent, or Firm*—Wall Marjama & Bilinski LLP

(57) ABSTRACT

Screen printing stencils are produced by a positive-working method which involves no light-sensitive materials and does not require the use of safe lights. A coated receptor film having a coating layer and a support layer is imaged using an ink-jet printer or plotter in areas corresponding to the open stencil areas. The film is then applied to a mesh and an emulsion applied. Chemical hardening of the emulsion takes place in the non-imaged areas. The stencil is then produced by removing the support layer of the film and washing away the unhardened emulsion. The receptor film may include a layer which is incorporated into the stencil layer to form a profile. In addition to screen production methods, coated films, coating compositions and compositions for imagewise application are disclosed.

127 Claims, 7 Drawing Sheets

U.S. PATENT DOCUMENTS

| | | |
|---|---|---|
| 4,412,232 A | 10/1983 | Weber et al. |
| 4,435,305 A | 3/1984 | Tsoukalas et al. |
| 4,436,032 A | 3/1984 | van Ouwerkerk |
| 4,477,557 A | 10/1984 | Rauch |
| 4,538,156 A | 8/1985 | Durkee et al. |
| 4,550,660 A | 11/1985 | Sato et al. |
| 4,583,458 A | 4/1986 | Beachum |
| 4,896,597 A | 1/1990 | Hayata et al. |
| 5,188,664 A | 2/1993 | Adamic et al. |
| 5,213,032 A | 5/1993 | van Akkeren et al. |
| 5,270,078 A | 12/1993 | Walker et al. |
| 5,292,556 A | 3/1994 | Ma et al. |
| 5,303,647 A | 4/1994 | Seo et al. |
| 5,306,376 A | 4/1994 | James |
| 5,380,769 A | 1/1995 | Titterington et al. |
| 5,466,653 A | 11/1995 | Ma et al. |
| 5,553,538 A | 9/1996 | Freitag |
| 5,654,032 A * | 8/1997 | Gybin et al. ................ 427/140 |
| 5,749,292 A | 5/1998 | De Bastiani et al. |
| 5,819,653 A | 10/1998 | McCue |
| 5,824,362 A | 10/1998 | Watanabe |
| 5,860,361 A | 1/1999 | Nanjyo et al. |
| 6,393,980 B2 * | 5/2002 | Simons ................ 101/128.21 |
| 6,539,856 B2 * | 4/2003 | Jones et al. ............ 101/128.21 |

OTHER PUBLICATIONS

Publication from The Printers Forum entitled "Industrial Screen Printing using the new JetScreen Technology" by Thomas Schweizer, et al. dated Aug. 12, 1996.

* cited by examiner

SCREEN PRINTING STENCIL PRODUCTION

CROSS REFERENCE TO RELATED APPLICATION

This is a continuation application of U.S. Ser. No. 09/245,190, filed Feb. 5, 1999 now abandoned, the entirety of which is incorporated herein by reference.

BACKGROUND TO THE INVENTION

1. Field of the Invention

The present invention relates to the production of stencils for screen printing.

2. Related Background Art

The production of screen printing stencils is generally well known to those skilled in the art.

One method, referred to as the "direct method" of producing screen printing stencils involves the coating of a liquid light-sensitive emulsion directly onto the screen mesh. After drying, the entire screen is exposed to actinic light through a film positive held in contact with the screen in a vacuum frame. The black portions of the positive do not allow light to penetrate to the emulsion which remains soft in those areas. In the areas which are exposed to light, the emulsion hardens and becomes insoluble, so that, after washing out with a suitable solvent, the unexposed areas allow ink to pass through onto a substrate during a subsequent printing process.

Another method, referred to as the "direct/indirect method", involves contacting a film, consisting of a pre-coated unsensitised emulsion on a support base, with the screen mesh by placing the screen on top of the flat film. A sensitised emulsion is then forced across the mesh from the opposite side, thus laminating the film to the screen and at the same time sensitising its emulsion. After drying, the base support is peeled off and the screen is then processed in the same way as in the direct method.

In the "indirect method" a film base is pre-coated with a pre-sensitised emulsion. The film is exposed to actinic light through a positive held in contact with the coated film. After chemical hardening of the exposed emulsion, the unexposed emulsion is washed away. The stencil produced is then mounted on the screen mesh and used for printing as described above for the direct method.

In the "capillary direct method" a pre-coated and pre-sensitised film base is adhered to one surface of the mesh by the capillary action of water applied to the opposite surface of the mesh. After drying, the film is peeled off and the screen then processed and used as described for the direct method.

In addition to the above methods, hand-cut stencils can be used. These are produced by cutting the required stencil design into an emulsion coating on a film base support. The cut areas are removed from the base before the film is applied to the mesh. The emulsion is then softened to cause it to adhere to the mesh. After drying, the base is peeled off. The screen is then ready for printing. This method is suitable only for simple work.

One problem generally associated with the prior art methods is that many steps are necessary to produce the screen, thus making screen production time-consuming and labour-intensive.

Another problem is that normal lighting cannot be used throughout the screen production process in any of the methods except hand cutting. This is because the stencil materials are light-sensitive. In addition, it is necessary to provide a source of actinic (usually UV) light for exposing the stencil. This usually incurs a penalty of initial cost, space utilisation and ongoing maintenance costs.

Other methods of preparing printing screens are available. CA-A-2088400 (Gerber Scientific Products. Inc.) describes a method and apparatus in which a blocking composition is ejected directly onto the screen mesh surface in a pre-programmed manner in accordance with data representative of the desired image. The blocking composition directly occludes sections of the screen mesh to define the desired stencil pattern.

EP-A-0492351 (Gerber Scientific Products, Inc.) describes a method wherein an unexposed light-sensitive emulsion layer is applied to a screen mesh surface and a graphic is directly ink-jet printed on the emulsion layer by means of a printing mechanism to provide a mask through which the emulsion is exposed before the screen is further processed.

Both the above methods require the use of very specialised equipment which incurs a certain cost as well as imposing restrictions arising from the limitations of the equipment, in particular in terms of the size of screen and its resolution. The second method also requires sensitised films and emulsions, requiring exposure units and vacuum frames.

Ink-jet printers operate by ejecting ink onto a receiving substrate in controlled patterns of closely spaced ink droplets. By selectively regulating the pattern of ink droplets, ink jet printers can be used to produce a wide variety of printed materials, including text, graphics and images on a wide range of substrates. In many ink jet printing systems, ink is printed directly onto the surface of the final receiving substrate. An ink jet printing system where an image is printed on an intermediate image transfer surface and subsequently transferred to the final receiving substrate is disclosed in U.S. Pat. No. 4,538,156 (AT&T Teletype Corp.). Furthermore, U.S. Pat. No. 5,380,769 (Tektronix Inc.) describes reactive ink compositions containing at least two reactive components, a base ink component and a curing component, that are applied to the receiving substrate separately. The base ink component is preferably applied to the receiving surface using ink jet printing techniques and, upon exposure of the base ink component to the curing component, a durable, crosslinked ink is produced.

EP-A-0108509 (Pilot Man-Nen-Hitsu KK) describes a process in which a coating on a porous support is selectively chemically solubilised and then washed away.

EP-A-0770552 (Riso Kagaku Corporation) describes a machine in which a porous substrate forms the cylindrical surface of a drum. The substrate has a coating layer which is selectively solubilised prior to ink being passed outwardly through the substrate to be transferred to a substrate.

GB-A-180778 (Carter) describes a stencil paper which is coated with varnish prior to application of an ink. The ink and the varnish below is then washed away to form a stencil for a rotary duplicating machine.

Our co-pending Application PCT/GB97/01881 (WO99/02344, the content of which is incorporated herein by reference, describes a method of producing a screen-printing stencil which requires the image applied to a receptor element to be a negative image (this known as "negative working"). In the present application, a method is disclosed which uses a positive image ("positive working"). Each method has its advantages compared with the other, depending upon the circumstances of use.

One object of the present invention is to make screen-printing stencil production less time-consuming and labour-intensive.

Another object is to allow normal lighting to be used throughout the stencil production process and to avoid both the problems of prior art stencil materials which are light-sensitive and also the need to provide a source of actinic (usually UV) light for exposing the stencil.

SUMMARY OF THE INVENTION

The present invention provides a method of producing a screen-printing stencil having open areas and blocked areas for, respectively, passage and blocking of a printing medium, the method comprising:

provﾍiding a receptor element comprising an optional support base and an image-receiving layer comprising a first substance, applying imagewise to the image-receiving layer a second substance in areas corresponding to the open areas of the stencil to be produced, bringing the image-receiving layer into contact with a third substance applied in a layer to a screen-printing screen, causing or allowing chemical reaction to take place to form on the screen a stencil-forming layer having areas of relatively higher and relatively lower solubility corresponding to the open and the blocked stencil areas respectively, and washing away the stencil-forming layer in the higher solubility areas, thereby to produce the screen-printing stencil, the first, second and third substances being such that the said chemical reaction takes place as stated.

Within this overall scope, four particular methods can be identified as preferred aspects of the invention, although the invention is not limited to these four preferred aspects.

In a first preferred aspect, the invention provides a method of producing a screen-printing stencil having open areas and blocked areas for, respectively, passage and blocking of a printing medium, the method comprising:

providing a receptor element comprising an optional support base and an image-receiving layer comprising a chemical agent reactive with a stencil-forming chemical agent, applying imagewise to the image-receiving layer an inhibitor for the reaction between the chemical agent and the stencil-forming agent, the areas to which the inhibitor is applied corresponding to the open areas of the stencil to be produced, applying a composition comprising the stencil-forming chemical agent to a screen-printing screen, bringing the image-receiving layer of the receptor element into contact with the stencil-forming composition to allow the uninhibited chemical agent to react to produce on the screen a stencil-forming layer having areas of lower solubility corresponding to the blocked stencil areas and areas of higher solubility corresponding to the open stencil areas, removing any unreacted part of the receptor element, and washing away the stencil-forming chemical agent in the higher solubility areas, thereby to produce the screen-printing stencil.

In a second preferred aspect, the invention provides a method of producing a screen-printing stencil having open areas and blocked areas for respectively passage and blocking of a printing medium, the method comprising:

providing a receptor element comprising an optional support base and an image-receiving layer, applying imagewise to the image-receiving layer a reaction inhibitor, the areas to which the inhibitor is applied corresponding to the open areas of the stencil to be produced, applying to a screen-printing screen a composition comprising a stencil-forming chemical agent, a chemical agent reactive therewith and a temporary inhibitor for the reaction therebetween, the said reaction being inhibited by the reaction inhibitor, bringing the image-receiving layer of the receptor element into contact with the composition applied to the screen-printing screen, causing or allowing the temporary inhibitor to leave the composition applied to the screen and thereby allow the stencil-forming chemical agent and the chemical agent reactive therewith to react where not inhibited by the reaction inhibitor and thereby produce on the screen a stencil-forming layer having areas of lower solubility corresponding to the said blocked areas and areas of higher solubility corresponding to the open stencil areas, removing any unreacted part of the receptor element, and washing away unreacted composition from the higher solubility areas, thereby to produce the screen-printing stencil.

In a third preferred aspect, the invention provides a method of producing a screen-printing stencil having open areas and blocked areas for respectively passage and blocking of a printing medium, the method comprising:

providing a receptor element comprising an optional support base and an image-receiving layer comprising a chemical agent reactive with a stencil-forming chemical agent, applying imagewise to the image-receiving layer a masking agent which prevents migration of the chemical agent from the image-receiving layer, the areas to which the masking agent is applied corresponding to the open areas of the stencil to be produced, applying a composition comprising the stencil-forming chemical agent to a screen-printing screen, bringing the image-receiving layer of the receptor element into contact with the stencil-forming chemical agent to allow the reactive chemical agent in areas not masked by the masking agent and the stencil-forming chemical agent to react to produce on the screen a stencil-forming layer having areas of lower solubility corresponding to the blocked areas and areas of higher solubility corresponding to the open stencil areas, removing the unreacted part of the receptor element, and washing away the second stencil-forming chemical agent in the higher solubility areas, thereby to produce the screen-printing screen.

In a fourth preferred aspect, the invention provides a method of producing a screen-printing stencil having open areas and blocked areas for, respectively, passage and blocking of a printing medium, the method comprising:

providing a receptor element comprising an optional support base, and an image-receiving layer comprising at least one component of a polymerisation system, applying imagewise to the image-receiving layer an inhibitor for the polymerisation, the areas to which the inhibitor is applied corresponding to the open areas of the stencil to be produced, applying a stencil-forming composition comprising further components, including polymerisable material, of the polymerisation system to a screen-printing screen, bringing the image-receiving layer of the receptor element into contact with the stencil-forming composition to allow the polymerisation to take place where not inhibited by the inhibitor to produce on the screen a stencil-forming layer having areas of lower solubility corresponding to the blocked stencil areas and areas of higher solubility corresponding to the open stencil areas, removing any unreacted part of the receptor element, and washing away the stencil-forming composition in the higher solubility areas, thereby to produce the screen-printing stencil.

In any of these aspects, the image-receiving layer of the receptor element may comprise a substance which takes part in the reaction between the stencil-forming chemical agent and the chemical agent reactive therewith, whereby the chemical agent of the image-receiving layer forms a part of the stencil-forming layer of the stencil produced after washing away unreacted composition from the higher solubility areas.

The invention further provides a coated film product for use in the production of a screen-printing stencil, the product comprising an optional support base and an image-receiving layer which comprises one or more of the following active agents:

boric acid;

a boron salt, for example Group I and Group II metal borates;

an aldehyde, for example formaldehyde:

a dialdehyde, for example glyoxal and glutaraldehyde, optionally with a mineral acid; and transition metal compounds, for example iron (III), zirconium and titanium salts and chromium compounds, for example, pentahydroxy (tetradecanoate) dichromium and its derivatives.

Such a film product is particularly useful in methods according to the first and third preferred aspects of the invention but is not limited to such use.

The invention further provides a coated film product for use in the production of a screen-printing stencil, the product comprising an optional support base and an image-receiving layer which comprises at least one component of a free-radical generating system.

Preferably, the image-receiving layer further comprises a compound capable of taking part in a free-radical polymerisation process.

Such a film product is particularly useful in methods according to the fourth preferred aspect of the invention but is not limited to such use.

The invention also provides a pre-filled cartridge for a dropwise application device such as an ink-jet printer of plotter, the cartridge containing one or more of the following, optionally in a suitable liquid solvent or carrier:

a substance capable of reacting with boric acid or a boron salt, for example a Group I or Group II metal borate, in order to produce an insoluble borate;

a chelating agent, preferably an alkylene diaminetetraacetic acid, for example ethylenediaminetetraacetic acid, or a derivative thereof, or a mixture of two or more such chelating agents; and an aromatic polyol, preferably an hydroxy-substituted benzene derivative, for example pyrogallol or catechol.

Such a cartridge is particularly useful in any of the four stated preferred aspects of the invention but is not limited to such use.

Still further, the invention provides a composition for use in coating a screen-printing mesh in the preparation of a screen-printing stencil, the composition comprising at least one compound capable of taking part in a free-radical polymerisation process to produce a hardened stencil material, and at least one component of a free-radical generating system.

Preferably, the composition includes a further substance which is incorporated into the polymerisation product upon polymerisation. The further substance may be, for example, polyvinyl alcohol.

Such a composition is particularly useful in methods according to the fourth preferred aspect of the invention but is not limited to such use.

Yet further, the invention provides a composition for use in coating a screen-printing mesh in the preparation of a screen-printing stencil, the composition comprising at least one compound capable of taking part in an ion-bridged cross-linking reaction to produce a hardened stencil layer on the mesh, a source of cross-linking ions, and a temporary inhibitor for the polymerisation reaction.

Such a composition is particularly useful in methods according to the second aspect of the invention but is not limited to such use.

According to the present invention, the stencil is formed by chemical means, without the need to use either special lighting conditions or actinic radiation.

Also, it is possible to carry out the invention with reduced expenditure in time and labour, compared with known processes.

The method of the invention is positive working: the material which is applied imagewise is applied in areas which correspond to the open areas of the eventual stencil.

When dropwise application is employed, the application is preferably controlled according to data encoding the desired pattern of blocked and open areas of the stencil to be produced. This control is conveniently by a computer, for example a personal computer. Thus, data representative of the desired output pattern can be input to a controller as pre-recorded digital signals which are used by the ejection head to deposit or not deposit the material applied imagewise as the head scans the surface of the receptor element. The invention is not however restricted to dropwise application of the material applied imagewise: other methods of application will achieve the same essential end, for example, the material applied imagewise could be applied with a hand-held marker pen.

BRIEF DESCRIPTION OF THE DRAWINGS

The invention will now be described by way of example with reference to the drawings of this specification, in which:

Referring to FIGS. 1 to 5, these show the production of a screen printing stencil shown in FIG. 5, starting with a receptor element 10 shown in FIG. 1.

FIG. 1 shows the receptor element 10 which consists of an image-receiving layer 11 coated on a flexible film support base 12. In this example, the image-receiving layer is about 10 μm in thickness and the support base about 75 μm.

FIG. 2 shows a liquid inhibitor 14 being applied to the image-receiving layer 11 in droplets 13 which are ejected from an ejection head (not shown) of, for example, an ink-jet printer controlled by a computer. The inhibitor 14 is applied imagewise to the image-receiving layer 11 in areas which correspond to the open areas of the stencil to be formed. The screen preparation method is therefore positive working.

Figure 1:
FIGS. 1 to 5 show schematically the successive steps in the production of a printing screen in accordance with the first or the fourth preferred aspect of the invention.
Figure 2:
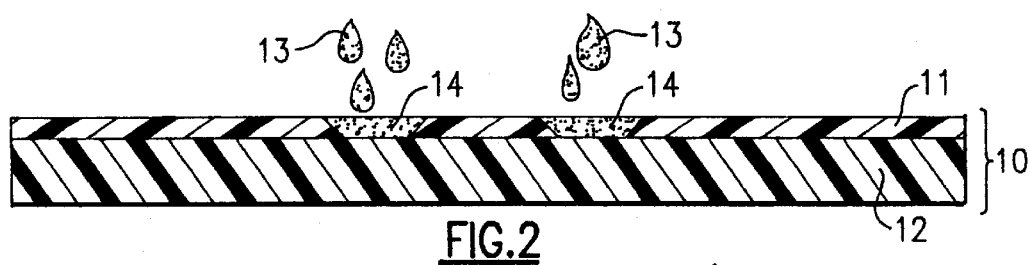

The inhibitor 14 is shown in FIG. 2 to be absorbed into the image-receiving layer 11. With other materials, the inhibitor might instead form a surface layer on the image-receiving layer. This point applies equally to the processes shown in FIGS. 5 to 10, 11 to 15 and 16 to 20.

Figure 3:
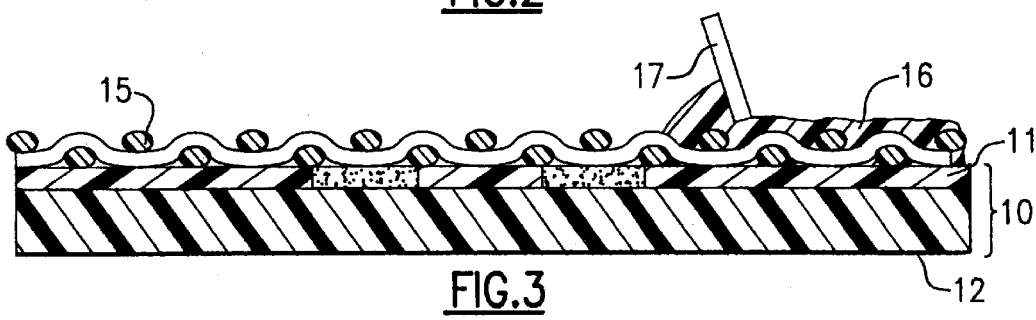

FIG. 3 of the drawings shows a screen mesh 15, to one surface of which the receptor element of FIG. 2 has been applied and to the other surface of which a stencil-forming agent 16 is being applied using a suitable spreader 17. In FIG. 3, the image-receiving layer 11 of the receptor element is brought into contact with the stencil-forming agent 16 when the latter is forced through the mesh 15 by the spreader 17.

This could alternatively have been achieved by first coating the mesh 15 with the stencil-forming agent 16 and then applying the receptor element 10 to the coated mesh 15.

When the receptor element is in contact with the screen mesh 15 as shown in FIG. 3, the areas of the image-receiving layer 11 to which no inhibitor 14 has been applied react with the corresponding areas of the stencil-forming agent 16 to form areas 18 which are insoluble or, at least, of lower solubility. The areas of the stencil-forming agent 16 which correspond to the areas where the inhibitor 14 is applied do not react with the image-receiving layer 11 and therefore retain a higher solubility.

Figure 4:
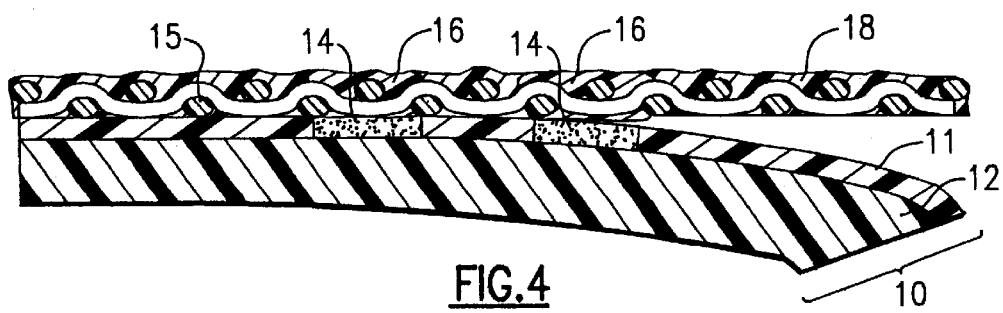

FIG. 4 of the drawings shows the receptor element 10 being peeled away from the screen mesh 15. The areas 16 of the stencil-forming agent corresponding to the areas of the image-receiving layer 11 to which the inhibitor 14 was applied are of significantly higher solubility than the remaining areas 16 where reaction with the image-receiving layer has produced areas 18 of insoluble material.

Figure 5:
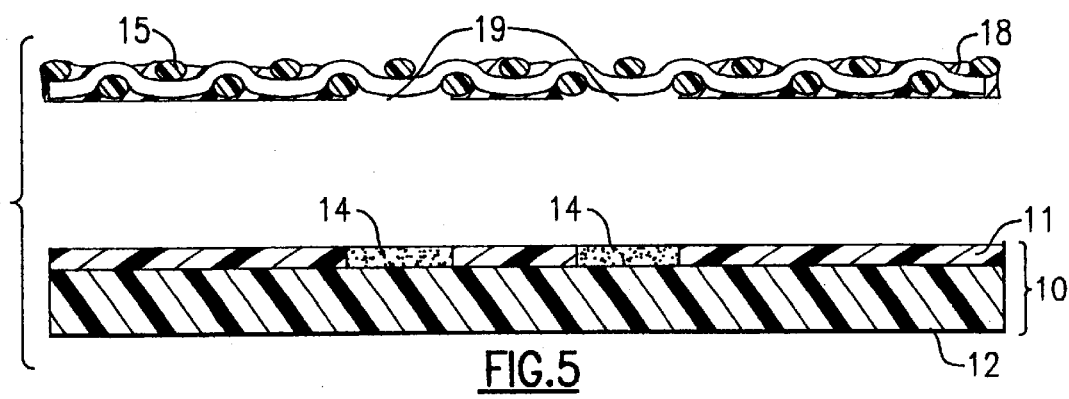

FIG. 5 shows the final screen separated from the receptor element 10 after the latter has been removed and the stencil has been washed out. The areas 18 of the stencil-forming layer corresponding to areas of the image-receiving layer 11 to which no inhibitor was applied remain to form the blocked areas of the stencil. The areas corresponding to those to which the inhibitor 14 was applied have been washed away and form the open areas 19 of the stencil.

Figure 6:
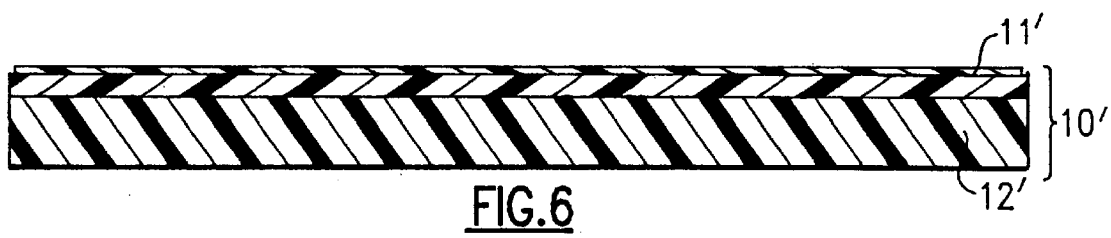
FIGS. 6 to 10 correspond to FIGS. 1 to 5 but show the successive steps in a modified method according to the first or the fourth preferred aspect of the invention.
Figure 7:
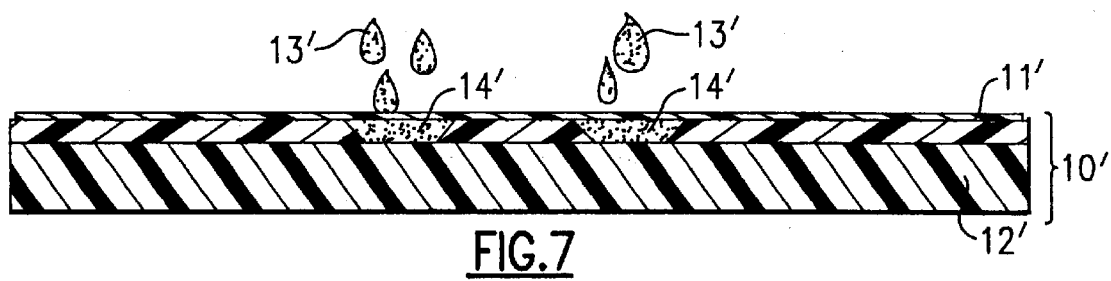
Figure 8:
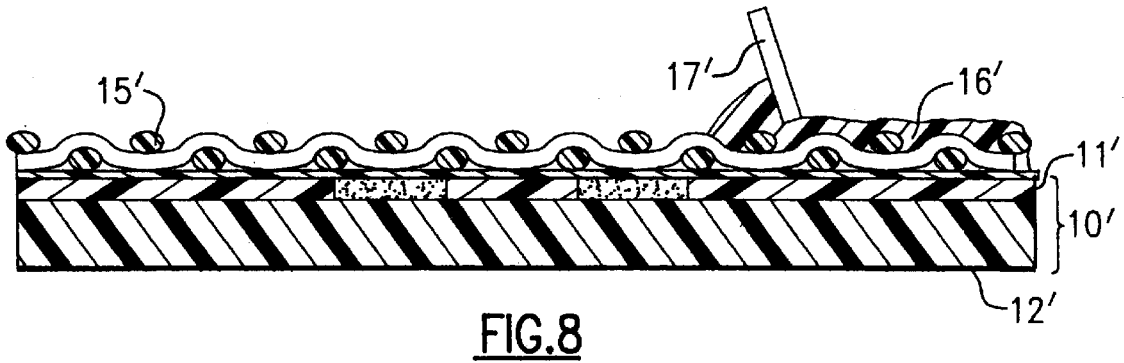
Figure 9:
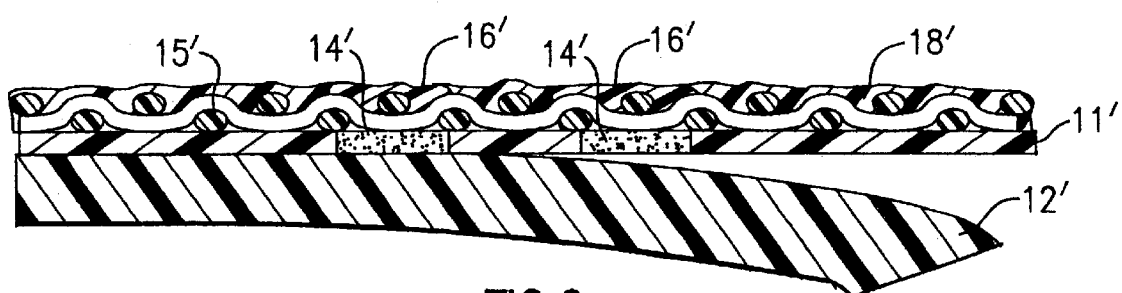
Figure 10:

Referring now to FIGS. 6 to 10, these show the production of a screen printing stencil shown in FIG. 10, starting with a receptor element shown in FIG. 6. The method is a modification of that described above. Primed reference numerals are used in FIGS. 6 to 10 to indicate features which correspond to features of FIGS. 1 to 5.

In this modified method, the image-receiving layer 11' contains a quantity of stencil-forming agent 16'. This is achieved by coating the component of the image-receiving layer 11' which reacts with the stencil-forming agent 16' as a separate layer of about 1 μm thickness coated over a pre-coated and solidified layer of stencil-forming agent.

An inhibitor 14' is applied imagewise in droplets 13', as shown in FIG. 7, again in areas to correspond to the open areas of the stencil to be formed. The receptor element 10' is brought into contact with a screen mesh 15' and a stencil-forming agent 16' applied. The alternative mentioned above could be employed if desired.

When the receptor element 10' is brought into contact with the mesh 15' as shown in FIG. 8, the reaction which takes place between the reactive component of the image-receiving layer 11' and the stencil-forming agent 16' applied to the mesh 15' involves also the stencil-forming agent in the image-receiving layer 11'. As a result, the stencil layer formed on the mesh 15' has an increased thickness compared with the thickness of the stencil layer in the unmodified method. A stencil of a thickness considerably greater than the mesh thickness is formed, the stencil being particularly enhanced in thickness on the print substrate side in use of the printing screen. This property of the screen is known as a "profile" and is advantageous in terms of the printing quality obtainable by use of the screen.

Referring now to FIG. 9 of the drawings, this shows the receptor element 10' being peeled away from the mesh 15'. In this case, only the support base 12' remains to be peeled away in a coherent layer, the image-receiving layer having reacted as described above.

FIG. 10 of the drawings shows the final screen, from which the "profile" can be readily seen.

Figure 11:
FIGS. 11 to 15 show schematically the successive steps in the production of a printing screen in accordance with the second preferred aspect of the invention.
Figure 13:
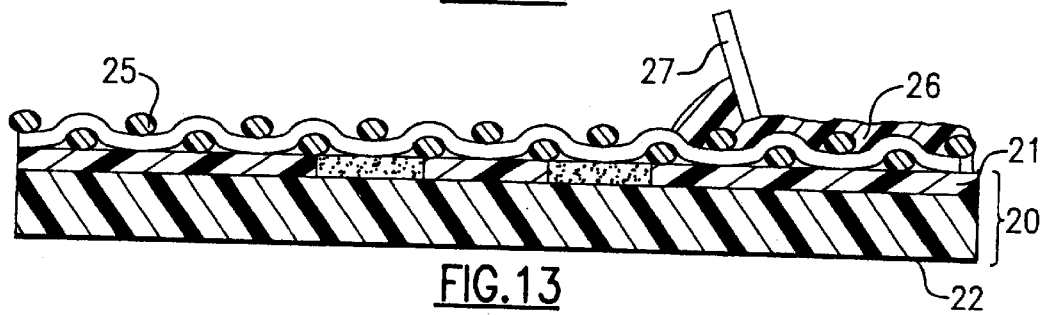
Figure 14:
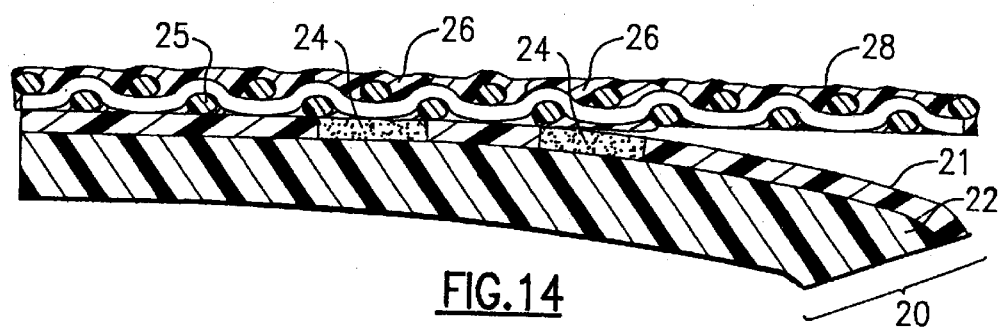
Figure 15:
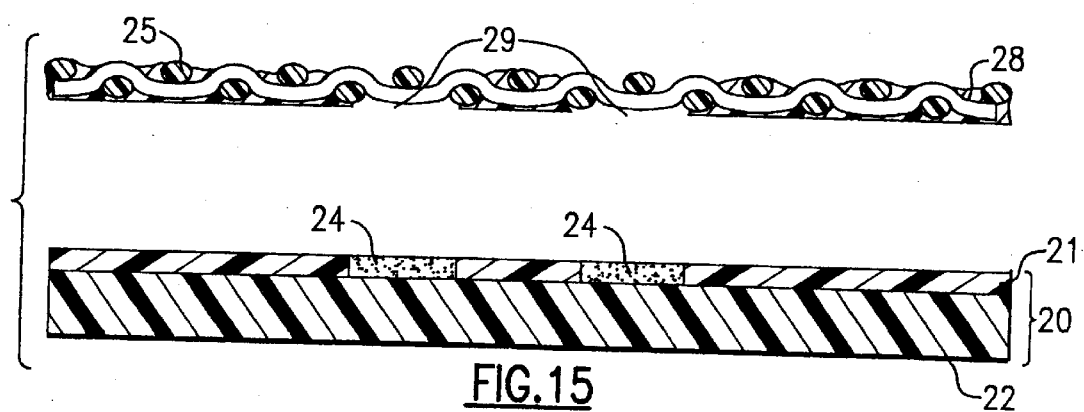
Figure 16:
FIGS. 16 to 20 correspond to FIGS. 11 to 15 but show the successive steps in a modified method according to the second preferred aspect of the invention.
Figure 17:
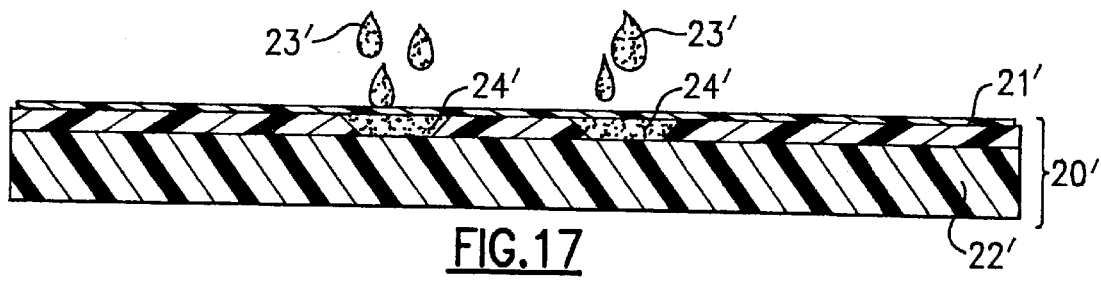

FIGS. 11 to 15 of the drawings show the production of a screen-printing stencil shown in FIG. 15, starting with a receptor element 20 shown in FIG. 11. The method of production of the stencil is in accordance with the second referred aspect of the invention.

FIG. 11 shows a receptor element 20 which again consists of an image-receiving layer 21 coated on a flexible film support base 22. In this example, the image-receiving layer 21 and the support base 22 are again about 10 μm and 75 μm in thickness, respectively.

Figure 12:
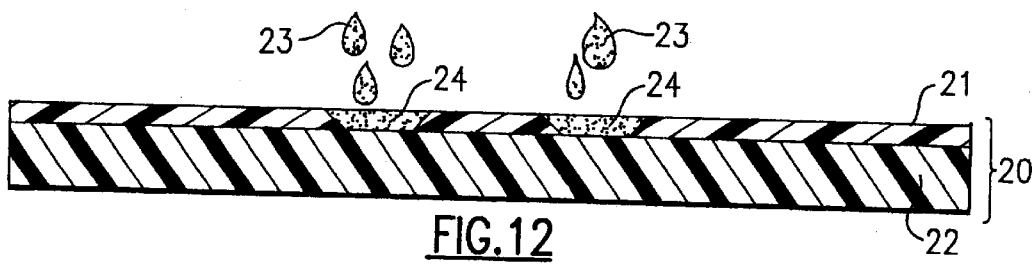

FIG. 12 shows a liquid reaction inhibitor 24 being applied to the image-receiving layer 21 in droplets 23 which are ejected from an ejection head (not shown) of, for example, an ink-jet printer controlled by a computer. The function of the reaction inhibitor is explained below. It is applied to the image-receiving layer 21 imagewise in areas 24 which correspond to the open areas of the stencil to be formed. The method is therefore again positive-working.

FIG. 13 shows a screen mesh 25, to one surface of which the receptor element 20 has been applied and to the other surface of which a stencil-forming composition 26 is being applied with a spreader 27. The stencil-forming composition 26 and the image-receiving layer of the receptor element 20 are thus brought into contact, as the spreader 27 forces the composition 26 through the mesh 25. The same contact could alternatively be achieved by first coating the mesh 25 with the composition 26 and then applying the receptor element 20 to the coated mesh.

The stencil-forming composition 26 has three components. The first and second components are substances which are capable of reacting with each other to form a stencil composition of substantially reduced solubility in a given wash-out solvent (see below). The third component is a temporary inhibitor for the reaction between the first and second components, in the presence of which the reaction therebetween does not take place.

With the receptor element 20 applied to the screen mesh 25 as shown in FIG. 13, the temporary inhibitor in the screen-forming composition is caused or allowed to leave the composition. For example, this may be achieved by application of moderate heat, such as from a warm-air blower, if the temporary inhibitor is of an appropriate volatility. In the absence of the temporary inhibitor, the reaction between the first and second components of the stencil-forming composition 26 takes place in the areas of the composition 26 which do not correspond to areas of the image-receiving layer 21 of the receptor element 20 to which the reaction inhibitor 24 was applied (see FIG. 12).

The support base 22 of the receptor element 20 can now be peeled away from the screen mesh 25, as shown in FIG. 14. This leaves low-solubility hardened areas 28 of the stencil-forming composition, corresponding to the areas of the receptor element to which no reaction inhibitor 24 was applied, and unhardened areas of high solubility corresponding to the areas where the reaction inhibitor 24 was applied.

The stencil screen 25 is now washed-out using a suitable solvent in which the unhardened parts of the stencil-forming layer are soluble. After washing-out, a final stencil screen as shown in the upper part of FIG. 15 is obtained. It will be noted that the open areas 29 of the stencil correspond to the areas 24 of the receptor element 20 to which the reaction inhibitor was applied imagewise in FIG. 12. The screen production method is therefore positive-working.

Figure 18:
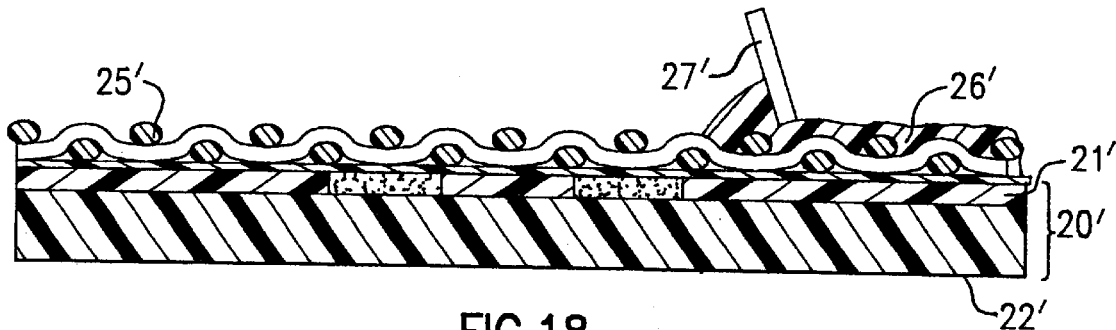
Figure 19:
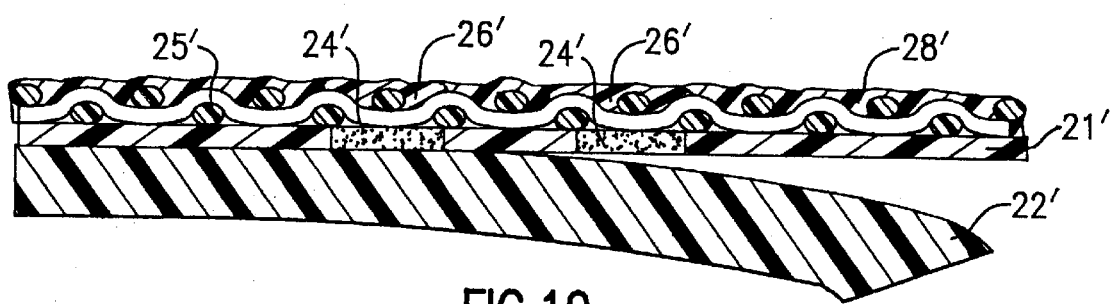
Figure 20:

In a modification of the method described with reference to FIGS. 11 to 15, the image-receiving layer of the receptor element is formed from a material which is reactive with the stencil-forming composition. This is shown in FIGS. 16 to 20 of the drawings, in which primed reference numerals are used to indicate features which correspond to features of FIGS. 11 to 15. In this modified method, the image-receiving layer 21' is formed from a substance which can take part in the reaction between first and second components of the stencil-forming composition 26'. Thus, in this modification, the hardening reaction which takes place in the stencil-forming layer also takes place in the image-receiving layer 21' of the receptor element 20', with the result that part of the receptor element becomes incorporated into the stencil layer of the final screen and provides a desirable "profile" or increased thickness of the stencil-layer. Thus, when the receptor element 20' is brought into contact with the mesh 25' as shown in FIG. 18, the reaction which takes place between the first and second components of the stencil-forming composition 26' involves also the material of the image-receiving layer 21' of the receptor element 20'. As a result, a screen having a substantial "profile" is produced, as can readily be seen from FIG. 20 which shows the final screen, after the support base 22' of the receptor element 20' has been peeled away, as shown in FIG. 19.

Figure 21:
FIGS. 21 to 25 show schematically the successive steps in the production of a printing screen in accordance with the third preferred aspect of the invention.
Figure 23:
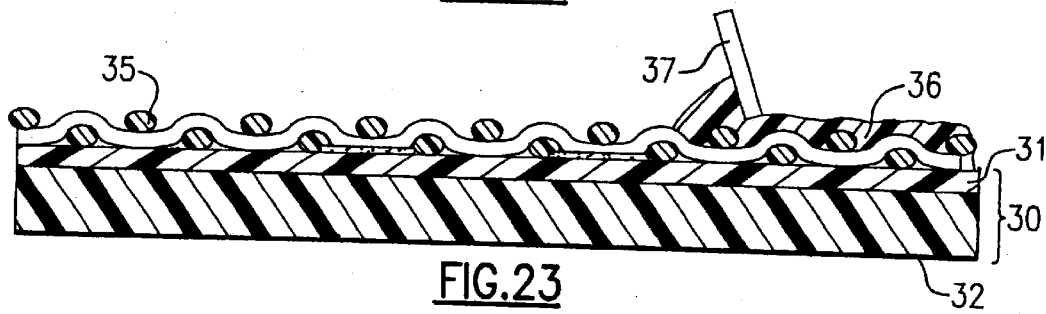
Figure 24:
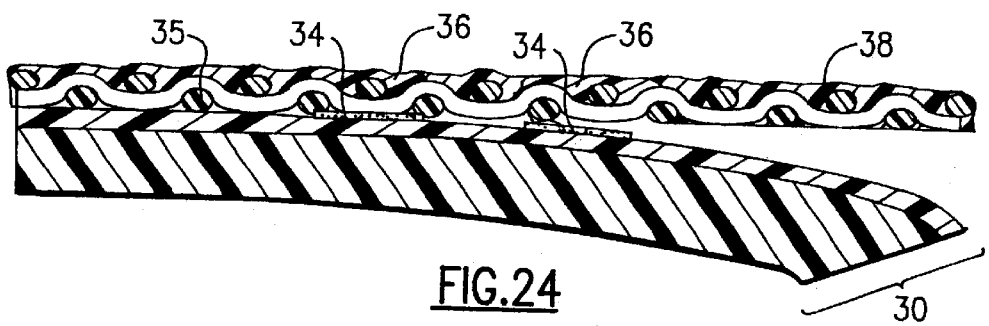
Figure 25:
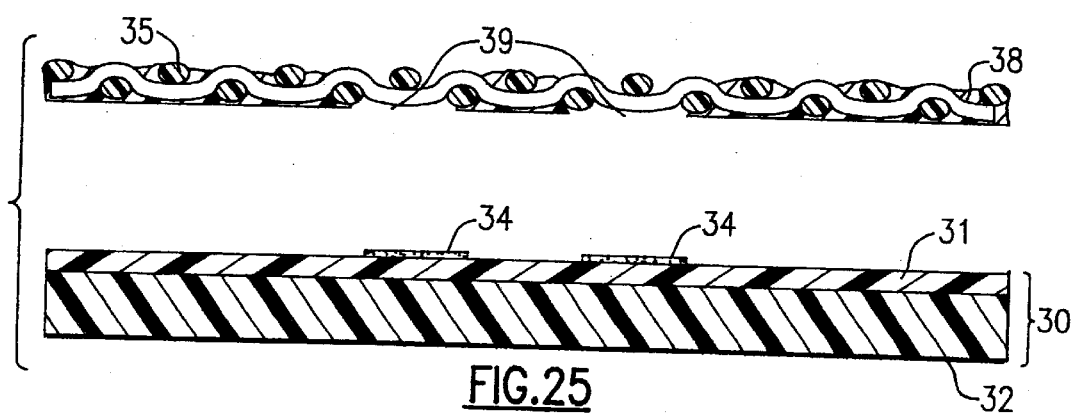

FIGS. 21 to 25 of the drawings show the production of a screen-printing stencil shown in FIG. 25, starting with a receptor element 30 shown in FIG. 21. The method of production of the stencil is in accordance with the third preferred aspect of the invention.

FIG. 21 shows a receptor element 30 which as before consists of an image-receiving layer 31 coated on a flexible film support base 32. The layer 31 and base 32 have thickness of about 10 μm and about 75 μm, respectively, in this example.

The image-receiving layer 31 of the receptor element 30 contains a chemical agent which is capable of reacting with a stencil-forming agent (see below) in order to produce a hardened stencil composition forming a stencil layer on a screen-printing screen.

Figure 22:
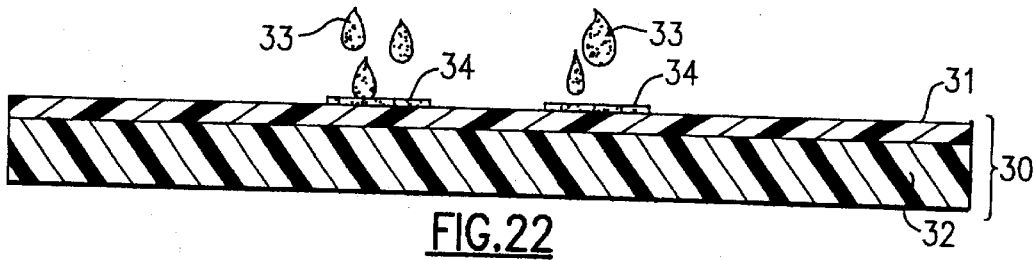

FIG. 22 shows the application to the image-receiving layer 31 in droplets 33 of a masking agent 34, for example a liquified wax or a solidifying polymer which functions to prevent migration of the chemical agent from the image-receiving layer 31 in areas to which the masking agent 34 is applied. The masking agent 34 is applied imagewise in areas corresponding to the open areas of the final stencil. The method is therefore positive-working.

FIG. 23 shows a screen mesh 35, to one surface of which the receptor element 30 has been applied and to the other surface of which a stencil-forming composition 36 is being applied with a spreader 37. The stencil-forming composition 36 and the image-receiving layer of the receptor element 30 are thus brought into contact, as the spreader 37 forces the composition 36 through the mesh 35. The same contact could alternatively be achieved by first coating the mesh 35 with the composition 36 and then applying the receptor element 30 to the coated mesh.

The stencil-forming composition 36 contains a second, stencil-forming chemical agent which can react with the chemical agent referred to above and contained in the image-receiving layer 31 to produce a stencil layer of substantially reduced solubility to a given wash-out solvent (see below).

With the receptor element 30 applied to the screen mesh 35 as shown in FIG. 23, the reaction between the stencil-forming chemical agent in the composition 36 and the chemical agent in the image-receiving layer takes place in the areas which do not correspond to these at which the masking agent 34 is applied to the receptor element 30.

The receptor element 30 is next peeled away from the screen mesh 35, as shown in FIG. 24. This leaves low-solubility hardened areas 38 of the stencil-forming composition, corresponding to the areas of the receptor element to which no masking agent 33 was applied, and unhardened areas of high solubility corresponding to the areas where the masking agent 34 was applied.

The stencil screen is now washed-out using a suitable solvent in which the unhardened parts of the stencil-forming layer are soluble. After washing-out, a final stencil screen as shown in FIG. 25 is obtained. FIG. 25 also shows the separated receptor element 30. It will be noted that the open areas 39 of the stencil correspond to the areas of the receptor element 30 to which the reaction inhibitor was applied imagewise in FIG. 22. The screen production method is therefore positive-working.

Figure 26:
FIGS. 26 to 30 correspond to FIGS. 21 to 25 but show the successive steps in a modified method according to the third preferred aspect of the invention.
Figure 28:
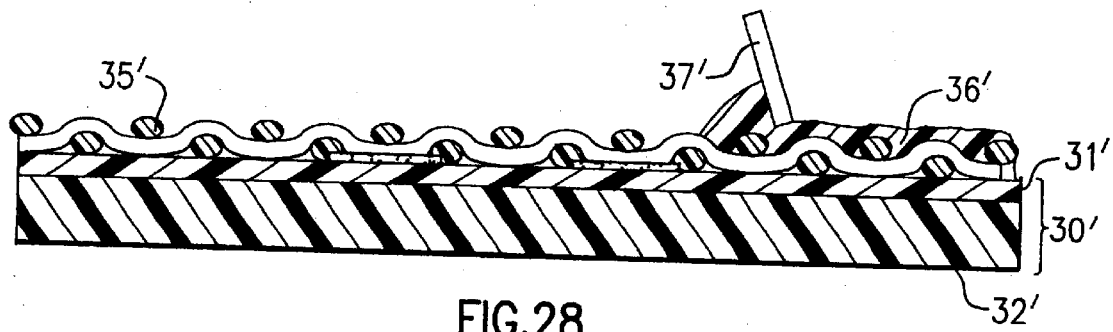
Figure 29:
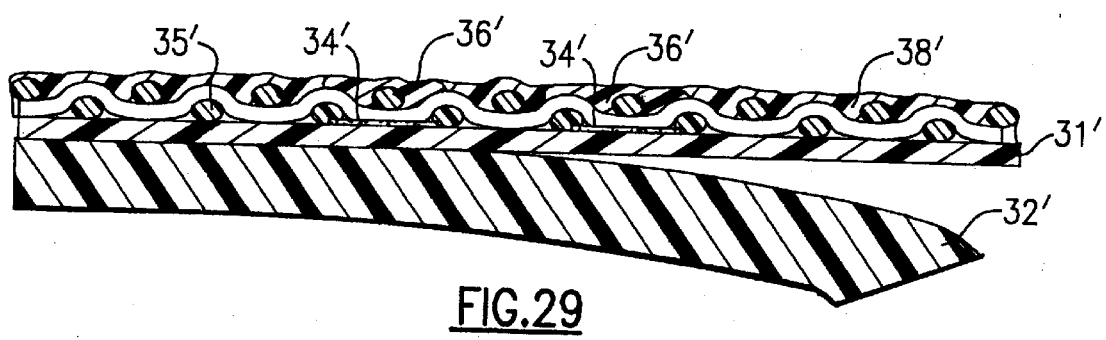
Figure 30:
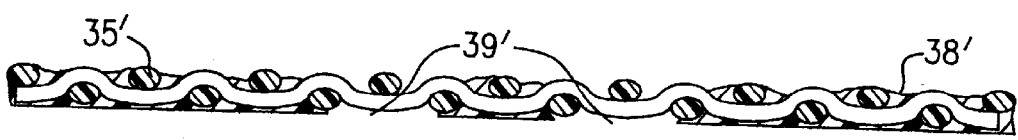

Referring now to FIGS. 26 to 30, these show the production of a screen printing stencil shown in FIG. 30, starting with a receptor element shown in FIG. 26. The method is a modification of the method described above with reference to FIGS. 20 to 25. Primed reference numerals are used in FIGS. 26 to 30 to indicate features which correspond to features of FIGS. 20 to 25.

In this modified method, the image-receiving layer 31' contains a quantity of stencil-forming agent 36'. This is achieved by coating the component of the image-receiving layer 31' which reacts with the stencil-forming agent as a separate layer of about 1 μm thickness coated over a pre-coated and solidified layer of stencil-forming agent 36'.

Figure 27:
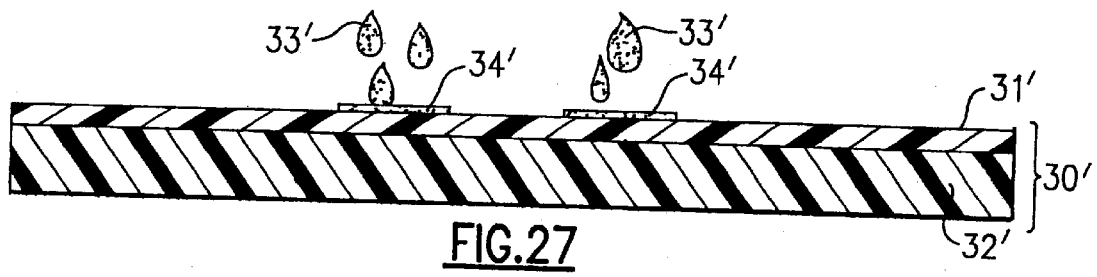

A masking agent 34' is applied imagewise in droplets 33' as shown in FIG. 27, in areas corresponding to the open areas of the eventual stencil. The receptor element 30' is then brought into contact with a screen mesh 25' and a stencil-forming agent 26' applied.

The alternative method mentioned above of achieving contact could be employed if desired.

When the receptor element 30' has been brought into contact with the mesh 35' as shown in FIG. 28, the reaction which takes place between the reactive component of the image-receiving layer 31' and the stencil-forming agent 36' applied to the mesh 35' involves also the stencil-forming agent in the image-receiving layer 31'. As a result, the stencil layer formed on the mesh 35' has an increased thickness compared with the thickness of the stencil layer in the unmodified method. A stencil of a thickness considerably greater than the mesh thickness is formed, the stencil being particularly enhanced in thickness on the print substrate side in use of the printing screen. This property of the screen is known as a "profile" and is advantageous in terms of the printing quality obtainable by use of the screen.

Referring now to FIG. 29 of the drawings, this shows the receptor element 30' being peeled away from the mesh 35'. In this case, only the support base 32' remains to be peeled away in a coherent layer, the image-receiving layer having reacted as described above.

FIG. 30 of the drawings shows the final screen, from which the "profile" can be readily seen.

DETAILED DESCRIPTION OF THE INVENTION

In some methods according to the present invention, for example as described above with reference to FIGS. 1 to 5, 11 to 15 and 21 to 25 of the drawings, the image-receiving layer is substantially inert and functions as a carrier for the material applied to it imagewise, the stencil-forming layer being formed substantially from the layer of the third substance only. In methods and coated film products according to the invention the layer may comprise one or more of the following polymers: water-soluble cellulose derivatives, for example hydroxypropyl cellulose, hydroxyethyl cellulose, carboxymethyl cellulose; polyvinylpyrrolidone and polyacrylic acids. The polymer(s) is/are preferably present in the image-receiving layer in an amount of 5 to 100 wt % of the image-receiving layer. The layer may also comprise, one or more of: suitable other polymers, fillers, binders, surfactants and plasticisers.

Alternatively, papers including ordinary papers and coated papers, can be used as the inert image-receiving layer, and, thereby, require no supporting base.

The key criterium in selecting a suitable combination of image-receiving layer and substance applied imagewise thereto is that a good image should be formed on the layer; for example, a drop of the substance should neither be so repelled by the layer as to produce a defective image nor it should not spread so far as to reduce the resolution of the image. Moreover, it should not spread so anisotropically (because of irregularities in the layer) as to deform the image.

In methods according to the invention, for example as described above with reference to FIGS. 6 to 10, 16 to 20 and 26 to 30 of the drawings, in which the stencil-forming layer is formed at least in part from the layer of the third substance and the image-receiving layer and thus forms a substantial, profile part of the final stencil, the image-receiving layer may comprise a substance which takes part in a polymerisation process involving the third substance and thereby forms the stencil layer of the final screen.

A typical example of the material of a reactive image-receiving layer in methods and products according to the invention is polyvinyl alcohol and which is preferably present in an amount of 5 to 100 wt % of the image-receiving layer and the balance comprising, for example, other suitable polymers, suitable fillers, binders, surfactants and plasticisers. The polyvinyl alcohol preferably has a degree of hydrolysis of 20 to 99.9 mole % and, independently thereof, a degree of polymerisation of 100 to 3500.

Numerous other reactive polymers could alternatively be utilised in the present invention in this context. Examples of such polymers are:
polyvinyl alcohol derivatives, including carboxylated and acrylamide-grafted derivatives and polyvinyl acetate; gelatin and its derivatives;
carboxylated polymers capable of becoming water soluble on addition of alkali, e.g. carboxylated acrylics, ethylene-acrylic acid and styrene-acrylic acid copolymers; and
polyacrylamides and derivatives thereof, including carboxylated derivatives.

In general, the active component(s) of the image-receiving layer may constitute from 0.5 to 100 wt % of the image-receiving layer.

In methods and products according to the present invention, polymers and other components used are chosen so that the material applied imagewise forms a good image when applied. Layers that are not compatible with any solvent (typically, water) used in the material applied imagewise will produce insufficient spread of the liquid and a poor-quality image will result. If the layer to which the material is supplied is too compatible, then the material will spread too far, giving a blurred, low resolution image.

As mentioned, the receptor element can be with or without a support base. Without the support base, the image receiving layer is typically 6 to 250 μm in thickness. With a support base the coating thickness is typically from 0.1 to 50 μm.

The support base may comprise a non-reactive polymer, preferably an organic resin support, e.g. polyethylene terephthalate, polyethylene, polycarbonate, polyvinyl chloride or polystyrene. Alternatively a coated paper could be used as the receptor element, the paper and coating constituting the support base and the image-receiving layers, respectively. An uncoated paper can alternatively constitute the image-receiving layer of a receptor element without a support base. Such an image-receiving layer is usually removed as a coherent film prior to washing away of the high solubility areas of the stencil-forming layer. The thickness of the support base film is preferably from 10 to 200 μm. The organic resin supports can optionally be coated with a subbing layer to give desired adhesion properties with the image-receiving layer. When used, the support base is usually removed as a coherent film in the screen production method prior to the removal of the areas of higher solubility, though it can be removed during this process.

When a liquid comprising an inhibitor is applied imagewise to the image-receiving layer, the liquid may be applied dropwise, conveniently by an ink-jet system such as (but not confined to) an ink-jet printer or ink-jet plotter. Alternatively, application can be continuous, for example by a hand-held delivery device, such as a pen. The liquid applied should exhibit desirable stability, surface tension and viscosity characteristics and may therefore contain surfactants, viscosity modifiers, light stabilisers and/or antioxidants. When the active component(s) of the material applied imagewise is/are not liquids, the material may include a suitable carrier, for example a suitable solvent or dispersant for the active components(s).

The third substance may be applied to the screen from one side thereof after the image-receiving layer of the receptor element has been brought into contact with the other side thereof. This may be achieved by placing the receptor element on a solid flat surface and placing the screen on top such that there is close contact between the screen and the receptor element. The third substance may be applied by a coating trough or 'squeegee'. Alternatively, a thin layer of the composition applied to the screen can be coated onto the screen mesh by a coating trough or 'squeegee' and the receptor element mounted manually with slight pressure, a technique well known to those skilled in the screen-printing art.

If a base support is used, this can conveniently be removed once the reaction taking place caused by contact between the image-receiving layer and the composition applied to the screen is substantially complete. The resulting screen stencil can be developed by washing away the portion of higher solubility with a suitable solvent, thereby leaving behind areas of reduced solubility to occlude areas of the mesh (this act of washing could also remove the optional support base and any other coherent film part of the receptor element if not removed earlier).

In some methods according to the invention, the chemical reaction(s) forming the stencil-forming layer on the screen may involve reactive agents which the first and third substances comprise, the second substance comprising a chemical inhibitor for the reaction.

The third substance may then comprise at least one polymeric material capable of taking part in a cross-linking reaction, the first substance comprises a cross-linking agent for the cross-linking reaction and the second substance comprises an inhibitor for the cross-linking reaction.

In preferred methods, the cross-linking agent of the first substance comprises one or more of:
boric acid;
boron salts, for example Group I and Group II metal borates;
    aldehydes, for example formaldehyde;
dialdehydes, for example glyoxal and glutaraldehyde,
    optionally with a mineral acid; and
transition metal compounds, for example iron (III), zirconium and titanium salts and chromium compounds, for example pentahydroxy (tetradecanoate) dichromium and its derivates.

In methods and products of the invention, the active agent(s) of the image-receiving layer may be coated as a separate, surface layer on the polymer layer. The surface layer may be, for example, from 0.1 to 5 $\mu$m, preferably 1 to 2 $\mu$m, in thickness.

The inhibitor may comprise a metal salt which reacts with the cross-linking agent(s) to form a compound of reduced reactivity. If the cross-linking agent comprises boric acid and/or a metal borate then the inhibitor may comprise at least one metal salt which reacts with the cross-linking agent to form an insoluble borate.

In other methods, the inhibitor may comprise a chelating agent which chelates the inhibitor(s) to form a complex of reduced reactivity.

When the cross-linking agent comprises one or more transition metal complexes then the inhibitor may comprise an alkylenediaminetetraacetic acid, for example ethylenediaminetetraacetic acid, or a derivative thereof, such as a sodium salt, or a mixture of two or more such compounds.

It is preferred that the inhibitor(s) should constitute 0.5 to 50 wt % of the second substance.

In other methods, the third substance comprises at least one compound capable of taking part in a free-radical polymerisation reaction, the first substance comprises at least one component of a free-radical generating system, further component(s) of which the third substance optionally comprises, and the second substance comprises an inhibitor for the free-radical generating system.

The polymerisable compound in methods, compositions and coated film products of the invention may be an acrylamide which is optionally grafted onto a polymeric compound, preferably polyvinyl alcohol.

The free-radical generating system may be an oxidative system and the second substance comprises a trapping agent. The system may comprise a source of iron (II) ions and oxidising agent, for example ammonium persulphate. Preferred trapping agents are polyhydric alcohols, more preferably aromatic polyhydroxyl compounds, for example pyrogallol and catechol.

Preferably, the first substance comprises the ion source and the third substance comprises the oxidising agent.

In other methods according to the invention, the chemical reaction(s) forming the stencil-forming layer on the screen may involve reactive agents which the first and the third substances comprise, the second substance forming a physical barrier between the first and the third substances.

The third substance may then comprise at least one polymeric material capable of taking part in a cross-linking reaction and the first substance comprises a cross-linking agent for the cross-linking reaction.

Suitable cross-linking agents are as listed above.

The second substance may comprise a wax which is applied in a molten state and then caused or allowed to solidify. Alternatively, the second substance may be a toner powder.

In further methods according to the invention, the chemical reaction(s) forming the stencil-forming layer on the screen may take place between agents which the third substance comprises, the second substance comprising a chemical inhibitor for the reaction.

The third substance may then comprise a temporary inhibitor for the reaction between the said agents, the method including a step of terminating the effect of the temporary inhibitor to allow the said reaction to take place where not inhibited by the chemical inhibitor.

Preferably, the third substance comprises at least one polymeric substance having reactive functional groups capable of taking part in a pH-sensitive ion-bridged cross-linking reaction and a source of ions for the reaction, the temporary inhibitor comprising a pH-adjusting agent which maintains the pH at a value at which the generation of cross-linking ions is suppressed.

The chemical inhibitor may comprise a chelating agent of the cross-linking ions, preferably an alkylenediaminetetraacetic acid, for example ethylenediaminetetraacetic acid, or a derivative thereof, such as a sodium salt, or a mixture of two or more such compounds.

If, in methods and compositions of the invention, the pH-adjusting agent is an acid source which maintains a pH sufficiently low to suppress generation of cross-linking ions, the acid source is preferably volatile and its effect is terminated by causing or allowing its evaporation.

In any method according to the invention, the third substance may comprise one or more of the following polymers: polyvinylalcohol and its derivatives, including carboxylated and acrylamide-grafted derivatives and polyvinyl acetate; gelatin and its derivatives; carboxylated polymers capable of becoming water soluble on addition of alkali, including carboxylated acrylics, ethylene-acrylic acid and styrene-acrylic acid copolymers; and polyacrylamides and derivatives thereof, including carboxylated derivatives.

Table 1 which follows lists examples of first, second and third chemical substances which can be used in accordance with the invention in order to produce a non-profiled stencil, that is one in which the stencil-forming layer is formed substantially from the layer of the third substance only.

TABLE 1

| | |
|---|---|
| First Substance | Cross-Linking Agents<br>Aqueous solutions of boron salts e.g. boric acid, Na or K tetraborate; transition metal compounds e.g. iron (III) salts such as chloride and sulphate, zirconium or titanium salts or pentahydroxy(tetradecanoate)dichromium and its derivatives.<br>Polymers<br>Cellulose and its derivatives that are water soluble e.g. hydroxypropyl cellulose, carboxymethyl cellulose, hydroxyethyl cellulose; polyvinyl alcohol and its derivatives with a degree of hydrolysis of 20 to 99.9 mole % and/or a degree of polymerisation of 100 to 3500; polyvinyl pyrrolidone and its derivatives and copolymers. |
| Second Substance | Inhibitors<br>Chelating agents e.g. disodium ethylenediaminetetraacetate, di or trisodium nitriloacetate; Group (II) metal salts which react to produce insoluble borate complexes e.g. zinc nitrate.<br>Masking Agents<br>Solid wax or solidifying polymer which becomes liquid upon heating; or electrostatic toner powder. |
| Third Substance | Temporary Chemical Inhibitors<br>Volatile organic or inorganic acid e.g. acetic acid or aqueous hydrochloric acid.<br>Stencil Forming Agents<br>Polyvinyl alcohol/polyvinyl acetate blends; polyvinyl alcohol and its derivatives with a degree of hydrolysis of 20 to 99.9 mole % and a degree of polymerisation of 100 to 3500; carboxylated polymers capable of becoming water soluble upon addition of alkali e.g. carboxylated acrylics, ethylene-acrylic acid and styrene-acrylic acid copolymers; carboxylated polyacrylamides.<br>Ion-Bridging Cross-Linking Agents<br>Iron (III) salts, e.g. iron (III) sulphate. |

Table 2 which follows lists examples of first, second and third chemical substances which can be used in accordance with the invention in order to produce a profiled stencil, that is one in which the stencil-forming layer is formed from the layer of the third substance and the image-receiving layer.

TABLE 2

| | |
|---|---|
| First Substance | Cross-Linking Agents<br>Aqueous solutions of boron salts e.g. boric acid, Na or K tetraborate; transition metal compounds e.g. iron (III) salts such as chloride or sulphate, zirconium or titanium salts or pentahydroxy(tetradecanoate)dichromium and its derivatives.<br>Free-Radical Sources<br>Transition metal salts capable of oxidation by oxidising agents (such as inorganic persulphates) to form free radicals as polymerisation initiators e.g. iron (II) sulphate.<br>Polymers<br>Polyvinyl alcohol and its derivatives with a degree of hydrolysis of 20 to 99.9 mole % and/or a degree of polymerisation of 100 to 3500; carboxylated polymers capable of becoming water soluble upon addition of alkali e.g. |

TABLE 2-continued

| | |
|---|---|
| | carboxylated acrylics, ethylene-acrylic acid and styrene-acrylic acid copolymers; carboxylated polyacrylamides; acrylamide monomers blended with polyvinyl alcohol or acrylamide monomers grafted onto polyvinyl alcohol e.g. N,N'-methylenebisacrylamide. |
| Second Substance | Inhibitors<br>Chelating agents e.g. disodium ethylenediaminetetraacetate, di or trisodium nitriloacetate; Group (II) metal salts which react to produce insoluble borate complexes e.g. zinc nitrate.<br>Free-Radical Trapping Agents<br>Polyhydric alcohols, e.g. pyrogallol and catechol. |
| Third Substance | Stencil-Forming Agents<br>Polyvinyl alcohol and its derivatives with a degree of hydrolysis of 20 to 99.9 mole % and a degree of polymerisation of 100 to 3500; carboxylated polymers capable of becoming water soluble upon addition of alkali e.g. carboxylated acrylics, ethylene-acrylic acid and styrene-acrylic acid copolymers; carboxylated polyacrylamides; acrylamide monomers blended with polyvinyl alcohol or acrylamide monomers grafted onto polyvinyl alcohol e.g. N,N'-methylenebisacrylamide<br>Temporary Chemical Inhibitors<br>Volatile organic acid e.g. acetic acid or aqueous hydrochloric acid.<br>Free-Radical Sources: Oxidising Agents<br>Ammonium persulphate.<br>Ion-Bridging Cross-Linking Agents<br>Iron (III) salts, e.g. iron (III) sulphate. |

The method of the invention preferably includes a further, reclaim step. When the first chemical agent comprises a borate, the reclaim may be carried out at a pH of 4 or less.

Where the chemicals used are those cited in the examples which follow, the broad physical properties, chemical resistances, washout solvent (water) and reclaim chemicals (typically periodate systems) will in many cases be those used routinely by screen printers. So, although the method of producing the stencil and the products and compositions used therein are new, the resulting screens will often be familiar and highly acceptable to screen printers.

The advantages of the processes of the present invention include: a screen stencil can be produced directly from digital information sources; it is not necessary to use safe-lights during the stencil making process; there is no requirement for an exposure step utilising an actinic radiation source; a finished stencil can be produced in a shorter time than by conventional screen printing techniques. The positive working system is more convenient than a negative system when small areas of the screen are to be printed. For instance, if 5% of the area is to be printed, a negative system would require 95% of the film to be covered with material applied imagewise, whereas a positive system would require only 5% coverage, a saving in computer memory, time and chemical agent.

EXAMPLES

The present invention is illustrated by the following examples 1 to 12 without however being limited thereto. In these examples, various commercially-available materials are listed by their trade names; the letters identifying the following companies:

(a) Hercules Inc., USA
(b) 3M, UK
(c) Nippon Gohsei, Japan
(d) ISP, UK (e) DuPont, UK
(f) Autotype International, UK
(g) Kuraray, Japan
(h) Allied Colloids, UK
(i) W. R. Grace, Germany Examples 1 to 4 are in accordance with the first preferred aspect of the invention, with examples 3 and 4 incorporating the modification described above to produce a "profiled" stencil. Examples 5 and 6 are in accordance with the fourth preferred aspect of the invention. Examples 7 to 10 are in accordance with the second preferred aspect of the invention with examples 9 and 10 incorporating the modification just mentioned above. Examples 11 and 12 are in accordance with the third preferred aspect of the invention.

Example 1

"Klucel E" (a) a hydroxypropyl cellulose was coated onto a polyethylene terephthalate support base from an aqueous solution at a coating weight of 10 g m$^{-2}$.

A dispersion of sodium tetraborate tetrahydrate (borax) was prepared by grinding a 33 wt. % mixture of borax in IMS in a ball mill for 48 hours.

The dispersion was diluted to 5 wt % and coated onto the hydroxypropyl cellulose with a 0.009 in Meyer bar, to give a coating weight of about 1 g m$^{-2}$. The resulting receptor element was passed through a commercial thermal ink jet printer (Hewlett Packard HP550) and liquid containing a chemical inhibitor agent was applied according to the formula:

| | |
|---|---|
| water | 39 wt % |
| zinc nitrate (prepared from zinc carbonate/hydroxide and nitric acid) | 10 wt % |
| glycerine | 50 wt % |
| "Fluorad FC-93" (b) (1%) - anionic fluorinated surfactant | 1 wt % |

In this example, the hydroxypropyl cellulose constitutes a non-reactive image-receiving layer coated on the polyethylene terephthalate support base. The borax dispersion is the first chemical agent which reacts with a stencil-forming agent which is polyvinyl alcohol which is provided in a 20 wt % aqueous solution of "Gohsenol GH-20" (c) (see below). The reaction which takes place between the borax dispersion and the polyvinyl alcohol is a chemical cross-linking which is inhibited by the zinc nitrate through formation of insoluble zinc borate. The receptor element was dried, then placed on a glass plate, with the coated layer facing uppermost. The receptor element was covered with a screen mesh of mesh count 62 threads per cm. Then a bead of "Gohsenol GH-20" (c) 20 wt % aqueous solution was placed on the mesh and drawn over the receptor element by means of a squeegee so that a thin layer of polyvinyl alcohol was forced through the mesh. The screen was dried by hot air fan until the polyethylene terephthalate support base could be peeled cleanly from the mesh. The screen was left to dry and then washed out using cold running water, until the portion of the assembly of higher solubility was washed away to waste.

Example 2

A 10 wt % aqueous solution of "K90" (d) polyvinyl pyrrolidone was coated onto a polyethylene terephthalate support base at a coating weight of 10 gm$^{-2}$.

A 10 wt % solution of pentahydroxy(tetradecanoate) dichromium "Quilon C" (e) in acetone/isopropanol was coated onto the polyvinyl pyrrolidone coating using a 0.009 in Meyer bar. This gave an approximate coating weight of 1 to 2 g m$^{-2}$.

The resulting receptor element was passed through a commercial thermal ink jet printer (Hewlett Packard HP550) and liquid containing a chemical inhibitor agent was applied according to the formula:

| | |
|---|---|
| water | 95 wt % |
| disodium ethylenediaminetetraacetic acid | 5 wt % |

In this example, the non-reactive image-receiving layer has been changed to polyvinyl pyrrolidone. The first chemical agent is "Quilon C" which reacts with the polyvinyl alcohol stencil-forming agent to effect a chemical cross-linking. This reaction is inhibited by the disodium ethylenediaminetetraacetic acid which complexes the chromium component of the "Quilon C". The receptor element was then treated in exactly the same manner as in example 1 above to give a screen stencil.

Example 3

Polyvinyl alcohol—"Gohsenol GH-20" (c) of 88% hydrolysis and degree of polymerisation 2000 was coated onto a polyethylene terephthalate support base from an aqueous solution at a coating weight of 10 g m$^{-2}$.

A dispersion of sodium tetraborate tetrahydrate (borax) was prepared by grinding a 33 wt % mixture of borax in IMS in a ball mill for 48 hours.

The dispersion was diluted to 5 wt % and coated onto the polyvinyl alcohol with a 0.009 in Meyer bar, to give a coating weight of about 1 g m$^{-2}$. The resulting receptor element was passed through a commercial thermal ink jet printer (Hewlett Packard HP550) and liquid containing a chemical inhibitor agent was applied according to the formula:

| | |
|---|---|
| water | 39 wt % |
| zinc nitrate (prepared from zinc carbonate/hydroxide and nitric acid) | 10 wt % |
| glycerine | 50 wt % |
| "Fluorad FC-93" (b) (1%) - anionic fluorinated surfactant | 1 wt % |

In this example, the non-reactive image-receiving layer of example 1 has been replaced by polyvinyl alcohol which reacts with the borax dispersion when, as described below, the receptor element is brought into contact with the mesh and further polyvinyl alcohol is applied. In this way, a stencil having a desirable "profile" is produced.

The receptor element was then treated in exactly the same way as in example 1 above to give a screen stencil. The screen stencil produced has a "profile" formed from the image-receiving layer.

Example 4

A 50:50 wt % blend of polyvinyl alcohol—"Gohsenol GH-20" (c) and polyvinyl acetate was coated onto a polyethylene terephthalate support base from an aqueous solution at a coating weight of 8 g m$^{-2}$.

A 10 wt % solution of pentahydroxy(tetradecanoate) dichromium "Quilon C" (e) in acetone/isopropanol was coated onto the polyvinyl alcohol/polyvinyl acetate coating using a 0.009 in Meyer bar. This gave an approximate coating weight of 1 to 2 g m$^{-2}$.

The resulting receptor element was passed through a commercial thermal ink jet printer (Hewlett Packard HP550) and liquid containing a chemical inhibitor agent was applied according to the formula:

| | |
|---|---|
| water | 95 wt % |
| disodium ethylenediaminetetraacetic acid | 5 wt % |

In this example, compared with example 3, the polyvinyl alcohol reactive image-receiving layer has been replaced by a blend of polyvinyl alcohol and polyvinyl acetate which remains reactive to the first chemical agent as in example 3, the reaction being inhibited by the inhibitor which is as in example 2.

The receptor element was then treated in exactly the same manner as in example 1 above to give a profiled screen stencil.

Example 5

A blend of 10 g "Gohsenol GH-20" (c) polyvinyl alcohol, 2.0 g iron (II) sulphate, 2.0 g N,N'-methylenebisacrylamide, 1.0 g water-soluble pigment and 100 g water was coated onto a polyethylene terephthalate support at a coating weight of 10 g m$^{-2}$.

The resulting dried receptor element was passed through a commercial thermal ink jet printer (Hewlett Packard HP550) and liquid containing a polymerisation inhibitor was applied imagewise according to the formula:

| | |
|---|---|
| water | 90 wt % |
| pyrogallol | 10 wt % |

The receptor element was dried, then placed on a glass plate, with the coated layer facing uppermost. The receptor element was covered with a screen mesh of mesh count 62 threads per cm and was laminated to the mesh using an emulsion of composition:

| | |
|---|---|
| "GH-20" (c) | 10.0 wt % |
| N,N'-methylenebisacrylamide | 2.0 wt % |
| ammonium persulphate | 2.0 wt % |
| aqueous pigment dispersion | 1.0 wt % |
| water | 85.0 wt % |

The screen was dried and processed as in example 1 to give a profiled screen stencil.

In this example, the coated blend of materials constitute a reactive image-receiving layer coated on a polyethylene terephthalate support base. The first chemical agent in this case is provided by the iron (II) sulphate which is oxidised by the ammonium persulphate contained in the stencil-forming composition to produce iron (III) ions and free radicals which initiate polymerisation of the N,N'-methylenebisacrylamide. The polymerisation process incorporates the polyvinyl alcohol into the stencil-forming layer formed by the polymerisation. The inhibitor for this reaction is provided by the pyrogallol which acts as a free-radical trapping agent.

Example 6

A blend of 12 g of an acrylamide-grafted polyvinyl alcohol (graft level 10 wt %) produced by grafting a formyl-containing acrylamide monomer onto polyvinyl alcohol in an acid-catalysed condensation reaction, 2.0 g iron (II) sulphate, 1.0 g water-soluble pigment and 100 g water was coated onto a polyethylene terephthalate support at a coating weight of 10 g m$^{-2}$.

The resulting dried receptor element was passed through a commercial thermal ink jet printer (Hewlett Packard HP550) and liquid containing a polymerisation inhibitor was applied imagewise according to the formula:

| | |
|---|---|
| water | 90 wt % |
| catechol | 10 wt % |

The receptor element was dried, then placed on a glass plate, with the coated layer facing uppermost. The receptor element was covered with a screen mesh of mesh count 62 threads per cm and was laminated to the mesh using an emulsion of composition:

| | |
|---|---|
| acrylamide grafted polyvinyl alcohol (graft level 10 wt %), | 12.0 wt % |
| ammonium persulphate | 2.0 wt % |
| aqueous pigment dispersion | 1.0 wt % |
| water | 85.0 wt % |

The screen was dried and processed as in example 1 to give a robust profiled screen stencil.

Compared with example 5, the polyvinyl alcohol and the N,N'-methylenebisacrylamide are replaced in this example by the acrylamide-grafted polyvinyl alcohol and the pyrogallol inhibitor by catechol.

Example 7

Polyvinyl alcohol—"Gohsenol GH-20" (c) of 88% hydrolysis and degree of polymerisation 2000 was coated onto a polyethylene terephthalate support base from an aqueous solution at a coating weight of 10 g m$^{-2}$.

The resulting receptor element was passed through a commercial thermal ink jet printer (Hewlett Packard HP550) and liquid containing a chemical inhibitor agent was applied according to the formula:

| | |
|---|---|
| water | 95 wt % |
| disodium ethylenediaminetetraacetic acid | 5 wt % |

The receptor element was then laminated to the mesh using the same procedure as in example 1, but using a solution of composition:

| | |
|---|---|
| KL-318 (g) - a carboxylated polyvinyl alcohol | 8.5 wt % |
| acetic acid | 5 wt % |
| iron (III) sulphate | 5 wt % |
| aqueous pigment dispersion | 1 wt % |
| water | 80.5 wt % |

The screen was dried using a warm-air dryer and processed as in example 1 to give a screen stencil.

In this example, the polyvinylalcohol constitutes a non-reactive image-receiving layer coated on a polyethylene terephthalate support base. The first and second chemical agents are the carboxylated polyvinyl alcohol and the iron (III) ions, respectively, the iron (III) ions reacting with the carboxyl groups to form bridges between the polyvinyl alcohol chains which are thereby cross-linked. The EDTA salt functions as an inhibitor for this reaction as it has a chelating action on the iron (III) ions. The reaction between the carboxylated polyvinyl alcohol and the iron (III) ions takes place only at pH values of about 5.5 and higher and is therefore temporarily inhibited by the acetic acid which is removed by evaporation when the screen is dried using the warm-air dryer.

Example 8

A 10 wt % aqueous solution of "K90" (d) polyvinyl pyrrolidone was coated onto a polyethylene terephthalate support base at a coating weight of 10 g m$^{-2}$.

The resulting receptor element was passed through a commercial thermal ink jet printer (Hewlett Packard HP550) and liquid containing a chemical inhibitor agent was applied according to the formula:

| | |
|---|---|
| water | 95 wt % |
| disodium ethylenediaminetetraacetic acid | 5 wt % |

The receptor element was then laminated to the mesh using the same procedure as in example 1, but using a solution of composition:

| | |
|---|---|
| "WSRN-25" (h) - a partially carboxylated 25% aqueous solution of polyacrylamide | 8.5 wt % |
| acetic acid | 5 wt % |
| iron (III) sulphate | 5 wt % |
| aqueous pigment dispersion | 1 wt % |
| water | 80.5 wt % |

The screen was dried and processed as in example 1 to give a screen stencil.

Compared with example 7, the non-reactive image-receiving layer has been changed to polyvinyl pyrrolidone and the carboxylated polyvinyl alcohol to carboxylated polyacrylamide.

Example 9

A carboxylated polyvinyl alcohol—"Kuraray KL-318" (g) was coated onto a polyethylene terephthalate support base from an aqueous solution at a coating weight of 10 g m$^{-2}$.

The resulting receptor element was passed through a commercial thermal ink jet printer (Hewlett Packard HP550) and liquid containing a chemical inhibitor agent was applied according to the formula:

| | |
|---|---|
| water | 95 wt % |
| disodium ethylenediaminetetraacetic acid | 5 wt % |

The receptor element was then laminated to the mesh using the same procedure as in example 1, but using a solution of composition:

| | |
|---|---|
| KL-318 (g) | 8.5 wt % |
| acetic acid | 5 wt % |
| iron (III) sulphate | 5 wt % |
| aqueous pigment dispersion | 1 wt % |
| water | 80.5 wt % |

The screen was dried and processed as in example 1 to give a profiled screen stencil.

Compared with example 8, the non-reactive polyvinyl pyrrolidone image-receiving layer has been replaced by carboxylated polyvinyl alcohol which takes part in the cross-linking reaction involving the iron (III) ions.

Example 10

"WSRN-25" (h)—a partially carboxylated 25% aqueous solution of polyacrylamide was coated onto a polyethylene terephthalate support base at a coating weight of 10 gm$^{-2}$.

The resulting receptor element was passed through a commercial thermal ink jet printer (Hewlett Packard HP550) and liquid containing a chemical inhibitor agent was applied according to the formula:

| | |
|---|---|
| water | 95 wt % |
| disodium ethylenediaminetetraacetic acid | 5 wt % |

The receptor element was then laminated to the mesh using the same procedure as in example 1, but using a solution of composition:

| | |
|---|---|
| "WSRN-25" (h) | 8.5 wt % |
| acetic acid | 5 wt % |
| iron (III) sulphate | 5 wt % |
| aqueous pigment dispersion | 1 wt % |
| water | 80.5 wt % |

The screen was dried and processed as in example 1 to give a screen stencil.

In this example, compared with example 8, the non-reactive polyvinyl pyrrolidone of the image-receiving layer has been replaced by carboxylated polyacrylamide which takes part in the cross-linking process to produce a profiled screen stencil.

Example 11

A blend of 90 g "Klucel E" (a) a hydroxypropyl cellulose, 10 g sodium tetraborate and 900 g water was coated onto a polyethylene terephthalate support at a coating weight of 10 g m$^{-2}$.

The resulting dried film was passed through a hot wax printer (Tektronix Inc., USA) and hot wax was applied imagewise to the surface of the coated film.

The receptor element was dried, then placed on a glass plate, with the coated layer facing uppermost. The receptor element was covered with a screen mesh of mesh count 62 threads per cm. Then a bead of "Autosol 2000" (f) a screen printing emulsion comprising a blend of polyvinyl alcohol and polyvinyl acetate was placed on the mesh and drawn over the receptor element by means of a squeegee so that a thin layer of emulsion was forced through the mesh. The screen was dried and processed as in example 1 to give a screen stencil.

In this example, the hydroxypropyl cellulose forms a non-reactive image-receiving layer on a polyethylene terephthalate support base. The sodium tetraborate constitutes the first chemical agent which reacts with the polyvinyl alcohol in the "Autosol 2000" to produce the stencil layer of the final screen stencil, the polyvinyl alcohol constituting the second chemical agent and the reaction being inhibited by the hot wax mask where applied.

Example 12

A blend of 90 g "Natrosol 250L" (a) a hydroxyethyl cellulose, 10 g sodium tetraborate, 900 g water and 4 g "Syloid ED41" (i) an inorganically treated silica, was coated onto a polyethylene terephthalate support at a coating weight of 10 g m$^{-2}$.

The resulting dried film was passed through a laser printer (Xante 8300), and toner powder as a masking agent was applied imagewise to the surface of the coated film.

The receptor element was then treated in the same way as example 11 to give a screen stencil.

Compared with example 11, the hydroxyethyl cellulose has replaced hydroxypropyl cellulose as the image-receiving layer in this example. The hot wax masking agent has been replaced by the dry toner. The purpose of the inorganically treated silica is to facilitate toner adhesion to the surface of the receiving layer.

Figure 31:
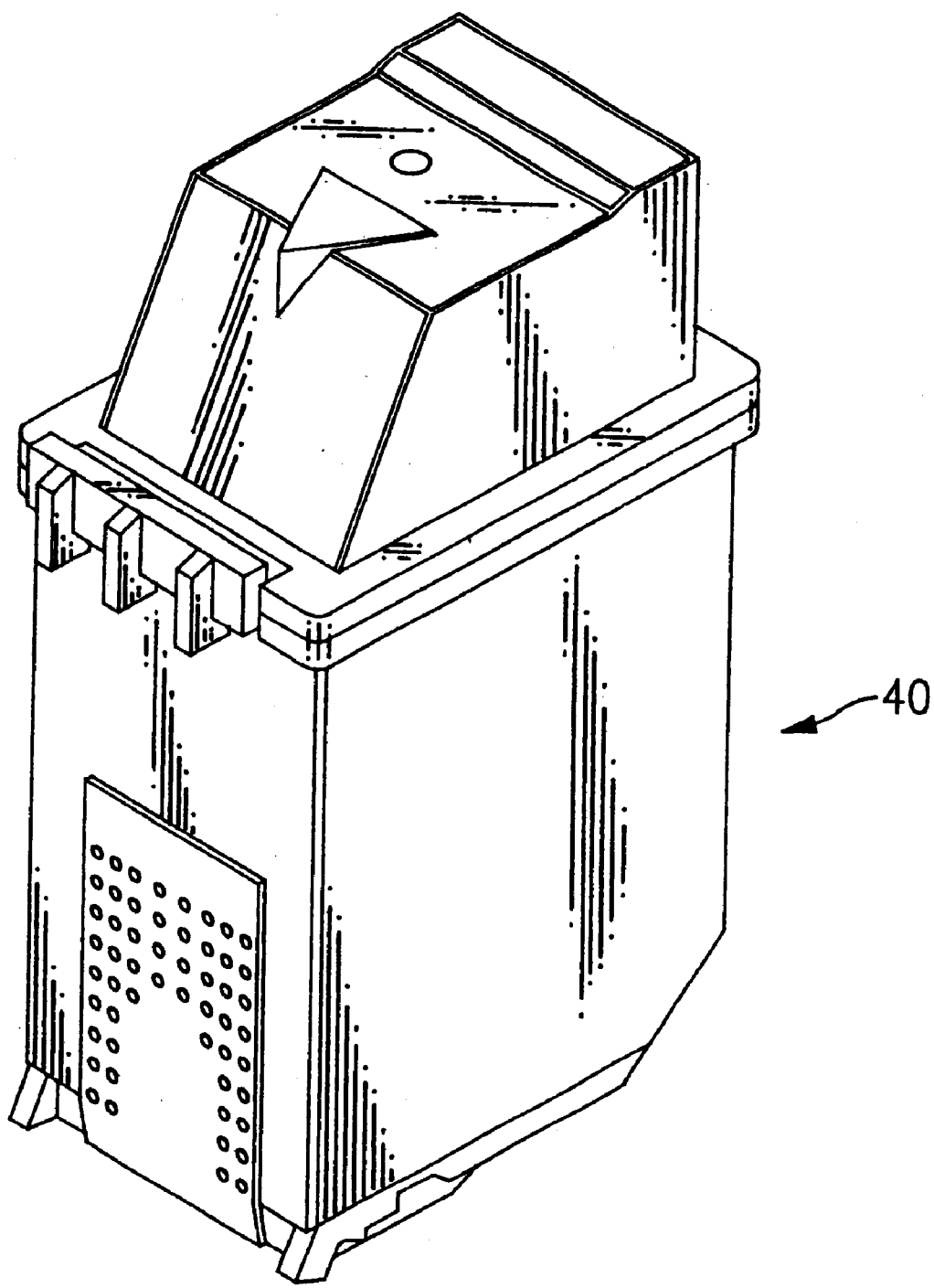
FIG. 31 is a perspective view of a cartridge for use in accordance with the invention.

FIG. 31 is a perspective view of a cartridge for use in an ink-jet printer or plotter, and pre-filled with a liquid such as is applied to the receptor elements shown in FIGS. 2, 7, 12, 17, 22 and 27 of the drawings.

Referring to FIG. 31 of the drawings, this shows a cartridge 40 for use in an ink-jet printer or plotter and pre-filled with a liquid such as is applied to the receptor elements 10, 10', 20, 20', 30 and 30' in the above description with reference to those figures.

It should be understood that the invention is not limited to the particular embodiments shown and described herein but that various changes and modifications may be made without departing from the scope and spirit of the invention.

We claim:

1. A method of producing a screen-printing stencil having open areas and blocked areas for, respectively, passage and blocking of a printing medium, the method comprising:

providing a receptor element comprising an image-receiving layer comprising a first substance, applying imagewise to the image-receiving layer a second substance in areas corresponding to the open areas of the stencil to be produced, bringing the image-receiving layer into contact with a third substance applied in a layer to a screen-printing screen, causing or allowing chemical reaction to take place to form on the screen a stencil-forming layer having areas of relatively higher and relatively lower solubility corresponding to the open and the blocked stencil areas respectively, and washing away the stencil-forming layer in the higher solubility areas, thereby to produce the screen-printing stencil, the first, second and third substances being such that the said chemical reaction takes place as stated.

2. A method according to claim 1, wherein the third substance is applied to the screen-printing screen from one side thereof after the image-receiving layer of the receptor element has been brought into contact with the other side thereof.

3. A method according to claim 1, wherein the said chemical reaction takes place to involve reactive agents which the first and third substances comprise, the second substance comprising a chemical inhibitor for the reaction.

4. A method according to claim 3, wherein the third substance comprises at least one polymeric material capable of taking part in a cross-linking reaction, the first substance comprises a cross-linking agent for the cross-linking reaction and the second substance comprises an inhibitor for the cross-linking reaction.

5. A method according to claim 4, wherein the inhibitor comprises a metal salt which reacts with the cross-linking agent(s) to form a compound of reduced reactivity.

6. A method according to claim 4, wherein the inhibitor comprises a chelating agent which chelates the inhibitor(s) to form a complex of reduced reactivity.

7. A method according to claim 4, wherein the cross-linking agent of the first substance comprises one or more of:

boric acid;

a boron salt;

an aldehyde; and a transition metal compound.

8. A method according to claim 7, wherein the cross-linking agent comprises a Group I or Group II metal borate.

9. A method according to claim 7, wherein the cross-linking agent comprises formaldehyde.

10. A method according to claim 7, wherein the cross-linking agent comprises a dialdehyde.

11. A method according to claim 10, wherein the dialdehyde is glyoxal.

12. A method according to claim 11, wherein the dialdehyde is glutaraldehyde.

13. A method according to claim 10, wherein the dialdehyde is activated by treatment with a mineral acid.

14. A method according to claim 7, wherein the cross-linking agent comprises an iron (III) salt.

15. A method according to claim 7, wherein the cross-linking agent comprises a zirconium salt.

16. A method according to claim 7, wherein the cross-linking agent comprises a titanium salt.

17. A method according to claim 7, wherein the cross-linking agent comprises a chromium compound.

18. A method according to claim 7, wherein the cross-linking agent comprises pentahydroxy(tetradecanoate) dichromium.

19. A method according to claim 7, wherein the cross-linking agent comprises a pentahydroxy(tetradecanoate) derivative.

20. A method according to claim 19, wherein the cross-linking agent of the first substance comprises one or more of:

boric acid;

a boron salt;

an aldehyde; and a transition metal compound.

21. A method according to claim 20, wherein the cross-linking agent comprises a Group I or Group II metal borate.

22. A method according to claim 20, wherein the cross-linking agent comprises formaldehyde.

23. A method according to claim 20, wherein the cross-linking agent comprises a dialdehyde.

24. A method according to claim 23, wherein the dialdehyde is glyoxal.

25. A method according to claim 23, wherein the dialdehyde is glutaraldehyde.

26. A method according to claim 23, wherein the dialdehyde is activated by treatment with a mineral acid.

27. A method according to claim 20, wherein the cross-linking agent comprises an iron (III) salt.

28. A method according to claim 20, wherein the cross-linking agent comprises a zirconium salt.

29. A method according to claim 20, wherein the cross-linking agent comprises a titanium salt.

30. A method according to claim 20, wherein the cross-linking agent comprises a chromium compound.

31. A method according to claim 20, wherein the cross-linking agent comprises pentahydroxy(tetradecanoate) dichromium.

32. A method according to claim 20, wherein the cross-linking agent comprises a pentahydroxy(tetradecanoate) dichromium derivative.

33. A method according to claim 7, wherein the cross-linking agent comprises boric acid and the inhibitor comprises at least one metal salt which reacts with the cross-linking agent to form an insoluble borate.

34. A method according to claim 7, wherein the cross-linking agent comprises a metal borate and the inhibitor comprises at least one metal salt which reacts with the cross-linking agent to form an insoluble borate.

35. A method according to claim 7, wherein the cross-linking agent comprises at least one transition metal complex and the inhibitor comprises at least one alkylenediaminetetraacetic acid.

36. A method according to claim 7, wherein the cross-linking agent comprises at least one transition metal complex and the inhibitor comprises at least one alkylenediaminetetraacetic acid derivative.

37. A method according to claim 3, wherein the inhibitor constitutes 0.5 to 50 wt % of the second substance.

38. A method according to claim 3, wherein the third substance comprises at least one compound capable of taking part in a free-radical polymerisation reaction, the first substance comprises at least one component of a free-radical generating system and the second substance comprises an inhibitor for the free-radical generating system.

39. A method according to claim 38, wherein the third substance comprises at least one further component of the free-radical generating system.

40. A method according to claim 38, wherein the polymerisable compound is an acrylamide.

41. A method according to claim 40, wherein the acrylamide is grafted onto a polymeric compound.

42. A method according to claim 41, wherein the polymeric compound is polyvinyl alcohol.

43. A method according to claim 38, wherein the free-radical generating system is an oxidative system and the second substance comprises a trapping agent.

44. A method according to claim 43, wherein the free-radical generating system comprises a source of transition metal ions which are capable of oxidation to a higher oxidation state and an oxidising agent therefor.

45. A method according to claim 44, wherein the source of transition metal ions is a source of iron (III) ions.

46. A method according to claim 44, wherein the first substance comprises the ion source and the third substance comprises the oxidising agent.

47. A method according to claim 43, wherein the trapping agent comprises an aromatic polyol.

48. A method according to claim 47, wherein the aromatic polyol is an hydroxy-substituted benzene derivative.

49. A method according to claim 48, wherein the benzene derivative is pyrogallol.

50. A method according to claim 48, wherein the benzene derivative is catechol.

51. A method according to claim 1, wherein the said chemical reaction takes place to involve reactive agents which the first and third substances comprise, the second substance forming a physical barrier between the first and the third substances.

52. A method according to claim 51, wherein the third substance comprises at least one polymeric material capable of taking part in a cross-linking reaction and the first substance comprises a cross-linking agent for the cross-linking reaction.

53. A method according to claim 51, wherein the second substance comprises a wax which is applied in a molten state and then caused or allowed to solidify.

54. A method according to claim 51, wherein the second substance is a toner powder.

55. A method according to claim 1, wherein the said chemical reaction takes place between agents which the third substance comprises, the second substance comprising a chemical inhibitor for the reaction.

56. A method according to claim 55, wherein the third substance comprises a temporary inhibitor for the reaction between the said agents, the method including a step of terminating the effect of the temporary inhibitor to allow the said reaction to take place where not inhibited by the chemical inhibitor.

57. A method according to claim 56, wherein the third substance comprises at least one polymeric substance having reactive functional groups capable of taking part in a pH-sensitive ion-bridged cross-linking reaction and a source of ions for the reaction, the temporary inhibitor comprising a pH-adjusting agent which maintains the pH at a value at which the generation of cross-linking ions is suppressed.

58. A method according to claim 57, wherein the chemical inhibitor comprises a chelating agent for the cross-linking ions.

59. A method according to claim 58, wherein the chelating agent comprises at least one alkylenediaminetetraacetic acid.

60. A method according to claim 58, wherein the chelating agent comprises at least one alkylenediaminetetraacetic acid derivative.

61. A method according to claim 57, wherein the pH-adjusting agent is an acid source which maintains a pH sufficiently low to suppress generation of cross-linking ions.

62. A method according to claim 61, wherein the acid source is volatile and its effect is terminated by causing or allowing its evaporation.

63. A method according to claim 1, wherein the stencil-forming layer is formed substantially from the layer of the third substance only.

64. A method according to claim 63, wherein the image-receiving layer comprises at least one of the following polymers: water-soluble cellulose derivatives, polyvinylpyrrolidone and polyacrylic acids.

65. A method according to claim 64, wherein the image-receiving layer comprises hydroxypropyl cellulose.

66. A method according to claim 64, wherein the image-receiving layer comprises hydroxyethyl cellulose.

67. A method according to claim 64, wherein the image-receiving layer comprises carboxymethyl cellulose.

68. A method according to claim 64, wherein the polymer(s) is/are present in the image-receiving layer in an amount of 5 to 100 wt % of the image-receiving layer.

69. A method according to claim 64, wherein the image-receiving layer contains at least one of: fillers, binders, surfactants and plasticisers.

70. A method according to claim 63, wherein the image-receiving layer comprises paper.

71. A method according to claim 70, wherein the paper is coated.

72. A method according to claim 1, wherein the stencil-forming layer is formed at least in part from the layer of the third substance and the image-receiving layer.

73. A method according to claim 72, wherein the image-receiving layer comprises at least one of the following polymers:
polyvinylalcohol;
polyvinyl alcohol derivatives;
gelatin;
gelatin derivatives;
carboxylated polymers capable of becoming water soluble on addition of alkali;
polyacrylamides;
polyacrylamide derivatives.

74. A method according to claim 73, wherein the image-receiving layer comprises a carboxylated polyvinyl alcohol.

75. A method according to claim 73, wherein the image-receiving layer comprises an acrylamide-grafted polyvinyl alcohol.

76. A method according to claim 73, wherein the image-receiving layer comprises as a polyvinyl alcohol derivative, polyvinyl acetate.

77. A method according to claim 73, wherein the image-receiving layer comprises, as a carboxylated polymer capable of becoming water soluble on addition of alkali, a carboyxlated acrylic polymer.

78. A method according to claim 73, wherein the image-receiving layer comprises, as a carboxylated polymer capable of becoming water soluble on addition of alkali, an ethylene-acrylic acid copolymer.

79. A method according to claim 73, wherein the image-receiving layer comprises, as a carboxylated polymer capable of becoming water soluble on addition of alkali, a styrene-acrylic acid copolymer.

80. A method according to claim 73, wherein the image-receiving layer comprises a carboxylated polyacrylamide.

81. A method according to claim 73, wherein the image-receiving layer comprises polyvinyl alcohol with a degree of hydrolysis of from 20 to 99.9 mole %.

82. A method according to claim 73, wherein the image-receiving layer comprises polyvinyl alcohol with a degree of polymerisation of from 100 to 3500.

83. A method according to claim 1, wherein the receptor element comprises a support base which supports the image-receiving layer.

84. A method according to claim 83, wherein the support base is from 10 to 200 μm in thickness.

85. A method according to claim 84, wherein the support base comprises at least one of polyethylene terephthalate, polyethylene, polycarbonate, polyvinyl chloride and polystyrene.

86. A method according to claim 84, wherein the image-receiving layer has a thickness of from 0.1 to 50 μm.

87. A method according to claim 1, wherein the receptor element has no support base and the image-receiving layer has a thickness of from 6 to 250 μm.

88. A method according to claim 1, wherein the third substance comprises at least one of the following polymers:
polyvinylalcohol;
polyvinylalcohol derivatives;
gelatin;
gelatin derivatives;
carboxylated polymers capable of becoming water soluble on addition of alkali;
polyacrylamides; and
polyacrylamide derivatives.

89. A method according to claim 88, wherein the third substance comprises a carboxylated polyvinyl alcohol.

90. A method according to claim 88, wherein the third-substance comprises an acrylamide-grafted polyvinyl alcohol.

91. A method according to claim 88, wherein the third substance comprises, as a polyvinyl alcohol derivative, polyvinyl actate.

92. A method according to claim 88, wherein the third substance comprises, as a carboxylated polymer capable of becoming water soluble on addition of alkali, a carboxylated acrylic polymer.

93. A method according to claim 88, wherein the third substance comprises, as a carboxylated polymer capable of becoming water soluble on addition of alkali, an ethylene-acrylic acid copolymer.

94. A method according to claim 88, wherein the third substance comprises, as a carboxylate polymer capable of becoming water soluble on addition of alkali, a styrene-acrylic acid copolymer.

95. A method according to claim 88, wherein the third substance comprises a carboxylated polyacrylamide.

96. A method according to claim 1, wherein the active component(s) of the image-receiving layer constitutes from 0.5 to 100 wt % of the image-receiving layer.

97. A method according to claim 1, wherein the second substance is applied dropwise to the image-receiving layer of the receptor element.

98. A method according to claim 97, wherein the dropwise application is by an ink-jet printer.

99. A method according to claim 97, wherein the dropwise application is by an ink-jet plotter.

100. A method according to claim 99, wherein the ink-jet plotter has more than one ejection head.

101. A method according to claim 98, wherein the ink-jet printer has more than one ejection head.

102. A method according to claim 1, wherein the first chemical agent is supplied to the receptor element by a hand-held delivery device.

103. A method according to claim 1, including a further, reclaim step.

104. A method according to claim 103, wherein the first chemical agent comprises a borate and the reclaim is carried out at a pH of 4 or less.

105. A method according to claim 104, wherein the receptor element comprises a support base which is removed before washing away the stencil-forming layer in the higher solubility areas.

106. A method according to claim 1, wherein the receptor element comprises a support base which is removed by the washing away of the stencil-forming layer in the higher solubility areas.

107. A method according to claim 1, including the further step of placing the screen-printing stencil in contact with a substrate and passing a printing medium through the open areas of the stencil.

108. A method of producing a screen-printing stencil having open areas and blocked areas for, respectively, passage and blocking of a printing medium, the method comprising:
providing a receptor element comprising an image-receiving layer comprising a chemical agent reactive with a stencil-forming chemical agent,
applying imagewise to the image-receiving layer an inhibitor for the reaction between the chemical agent and the stencil-forming agent, the areas to which the inhibitor is applied corresponding to the open areas of the stencil to be produced, applying a composition comprising the stencil-forming chemical agent to a screen-printing screen, bringing the image-receiving layer of the receptor element into contact with the stencil-forming composition to allow the uninhibited chemical agent to react to produce on the screen a stencil-forming layer having areas of lower solubility corresponding to the blocked stencil areas and areas of higher solubility corresponding to the open stencil areas, removing any unreacted part of the receptor element, and washing away the stencil-forming chemical agent in the higher solubility areas, thereby to produce the screen-printing stencil.

109. A method according to claim 108, wherein the image-receiving layer of the receptor element comprises a substance which takes part in the reaction between the stencil-forming chemical agent and the chemical agent reactive therewith, whereby the chemical agent of the image-receiving layer forms a part of the stencil-forming layer of the stencil produced after washing away unreacted composition from the higher solubility areas.

110. A method according to claim 108, wherein the receptor element comprises a support base which supports the image-receiving layer.

111. A method according to claim 110, wherein the support base is from 10 to 200 µm in thickness.

112. A method of screen-printing comprising the steps of:
providing a screen-printing stencil according to claim 108 which further includes,
placing the screen-printing stencil in contact with a substrate, and
passing a printing medium through the open areas of the stencil to produce printing on the substrate in areas corresponding to the open areas of the stencil.

113. A method of producing a screen-printing stencil having open areas and blocked areas for, respectively, passage and blocking of a printing medium, the method comprising:
providing a receptor element comprising an image-receiving layer comprising at least one component of a polymerisation system,
applying imagewise to the image-receiving layer an inhibitor for the polymerisation,
the areas to which the inhibitor is applied corresponding to the open areas of the stencil to be produced,
applying a stencil-forming composition comprising further components, including polymerisable material, of the polymerisation system to a screen-printing screen,
bringing the image-receiving layer of the receptor element into contact with the stencil-forming composition to allow the polymerisation to take place where not inhibited by the inhibitor to produce on the screen a stencil-forming layer having areas of lower solubility corresponding to the blocked stencil areas and areas of higher solubility corresponding to the open stencil areas,
removing any unreacted part of the receptor element, and
washing away the stencil-forming composition in the higher solubility areas, thereby to produce the screen-printing stencil.

114. A method according to claim 113, wherein the image-receiving layer of the receptor element comprises a substance which takes part in the reaction between the stencil-forming chemical agent and the chemical agent reactive therewith, whereby the chemical agent of the image-receiving layer forms a part of the stencil-forming layer of the stencil produced after washing away unreacted composition from the higher solubility areas.

115. A method according to claim 113, wherein the receptor element comprises a support base which supports the image-receiving layer.

116. A method according to claim 115, wherein the support base is from 10 to 200 µm in thickness.

117. A method of screen-printing comprising the steps of:
providing a screen-printing stencil according to claim 113 which further includes,
placing the screen-printing stencil in contact with a substrate, and
passing a printing medium through the open areas of the stencil to produce printing on the substrate in areas corresponding to the open areas of the stencil.

118. A method of producing a screen-printing stencil having open areas and blocked areas for respectively passage and blocking of a printing medium, the method comprising:
providing a receptor element comprising an image-receiving layer,
applying imagewise to the image-receiving layer a reaction inhibitor,
the areas to which the inhibitor is applied corresponding to the open areas of the stencil to be produced,
applying to a screen-printing screen a composition comprising a stencil-forming chemical agent, a chemical agent reactive therewith and a temporary inhibitor for the reaction therebetween, the said reaction being inhibited by the reaction inhibitor,
bringing the image-receiving layer of the receptor element into contact with the composition applied to the screen-printing screen,
causing or allowing the temporary inhibitor to leave the composition applied to the screen and thereby allow the stencil-forming chemical agent and the chemical agent reactive therewith to react where not inhibited by the reaction inhibitor and thereby produce on the screen a stencil-forming layer having areas of lower solubility corresponding to the said blocked areas and areas of higher solubility corresponding to the open stencil areas,
removing any unreacted part of the receptor element, and washing away unreacted composition from the higher solubility areas, thereby to produce the screen-printing stencil.

119. A method according to claim 118, wherein the image-receiving layer of the receptor element comprises a substance which takes part in the reaction between the stencil-forming chemical agent and the chemical agent reactive therewith, whereby the chemical agent of the image-receiving layer forms a part of the stencil-forming layer of the stencil produced after washing away unreacted composition from the higher solubility areas.

120. A method according to claim 118, wherein the receptor element comprises a support base which supports the image-receiving layer.

121. A method according to claim 120, wherein the support base is from 10 to 200 µm in thickness.

122. A method of screen-printing comprising the steps of:
providing a screen-printing stencil according to claim 118 which further includes, placing the screen-printing stencil in contact with a substrate, and passing a printing medium through the open areas of the stencil to produce printing on the substrate in areas corresponding to the open areas of the stencil.

123. A method of producing a screen-printing stencil having open areas and blocked areas for respectively passage and blocking of a printing medium, the method comprising:

providing a receptor element comprising an image-receiving layer comprising a chemical agent reactive with a stencil-forming chemical agent, applying imagewise to the image-receiving layer a masking agent which prevents migration of the chemical agent from the image-receiving layer, the areas to which the masking agent is applied corresponding to the open areas of the stencil to be produced, applying a composition comprising the stencil-forming chemical agent to a screen-printing screen, bringing the image-receiving layer of the receptor element into contact with the stencil-forming chemical agent to allow the reactive chemical agent in areas not masked by the masking agent and the stencil-forming chemical agent to react to produce on the screen a stencil-forming layer having areas of lower solubility corresponding to the blocked areas and areas of higher solubility corresponding to the open stencil areas, removing any unreacted part of the receptor element, and washing away the stencil-forming layer in the higher solubility areas, thereby to produce the screen-printing screen.

124. A method according to claim 123, wherein the image-receiving layer of the receptor element comprises a substance which takes part in the reaction between the stencil-forming chemical agent and the chemical agent reactive therewith, whereby the chemical agent of the image-receiving layer forms a part of the stencil-forming layer of the stencil produced after washing away unreacted composition from the higher solubility areas.

125. A method according to claim 123, wherein the receptor element comprises a support base which supports the image-receiving layer.

126. A method according to claim 125, wherein the support base is from 10 to 200 $\mu$m in thickness.

127. A method of screen-printing comprising the steps of:

providing a screen-printing stencil according to claim 123 which further includes, placing the screen-printing stencil in contact with a substrate, and passing a printing medium through the open areas of the stencil to produce printing on the substrate in areas corresponding to the open areas of the stencil.

* * * * *